United States Patent
Zhang et al.

(10) Patent No.: US 6,192,713 B1
(45) Date of Patent: Feb. 27, 2001

(54) APPARATUS FOR THE MANUFACTURE OF GLASS PREFORMS

(75) Inventors: Ying-Hua Zhang, Waltham; Brian M. Laliberte, Winchester; Ray F. Robinson, Wilmington, all of MA (US)

(73) Assignee: SDL, Inc., San Jose, CA (US)

( * ) Notice: Subject to any disclaimer, the term of this patent is extended or adjusted under 35 U.S.C. 154(b) by 0 days.

(21) Appl. No.: 09/340,473

(22) Filed: Jun. 30, 1999

Related U.S. Application Data

(60) Provisional application No. 60/091,290, filed on Jun. 30, 1998.

(51) Int. Cl.[7] .................. C03B 37/075; C03C 13/00; G02B 6/00
(52) U.S. Cl. ................. 65/390; 65/388; 65/389; 65/399; 65/417; 65/418
(58) Field of Search .............. 65/388, 389, 390, 65/399, 417, 418

(56) References Cited

U.S. PATENT DOCUMENTS

| | | | |
|---|---|---|---|
| 3,459,522 | 8/1969 | Elmer et al. | 65/30 |
| 3,775,075 | 11/1973 | Keck et al. | 65/3 |
| 3,806,570 | 4/1974 | Flanenbaum | 264/66 |
| 3,826,560 | 7/1974 | Schultz | 350/96 |
| 4,062,665 | 12/1977 | Izawa et al. | 65/3 |
| 4,217,027 | 8/1980 | MacChesney et al. | 350/96.3 |
| 4,257,797 | 3/1981 | Andrejco et al. | 65/3 |

(List continued on next page.)

FOREIGN PATENT DOCUMENTS

| | | | |
|---|---|---|---|
| 42 09 004 | 9/1993 | (DE) | C03B/37/018 |
| 0 286 626 | 10/1988 | (EP) | C03B/37/025 |
| 0 309 117 | 3/1989 | (EP) | C03B/37/014 |
| 2 303 129 | 2/1997 | (GB) | C03B/37/018 |
| WO 86/04573 | 8/1986 | (WO) | C03C/13/04 |
| WO 86 07348 | 12/1986 | (WO) | C03C/13/04 |
| 97/12429 | 4/1997 | (WO) . | |

OTHER PUBLICATIONS

B. James Ainslie, "A Review of the Fabrication and Properties of Erbium–Doped Fiber for Optical Amplifiers" *Journal of Lightwave Technology,* vol. 9, No. 2, Feb. 1, 1991, pp. 220–227.

"Optical Fiber Communications", Fiber Fabrication edited by Tingye Li, vol. 1, 1985 (Academic Press, Inc.) pp. 1–64.

*Primary Examiner*—James Derrington
*Assistant Examiner*—Michael P. Colaianni
(74) *Attorney, Agent, or Firm*—W. Douglas Carothers, Jr.

(57) ABSTRACT

A method and apparatus is disclosed for the manufacture of an optical fiber preform having incorporated therein a comparatively high concentration of rare earth dopant material, and which thus can be drawn and processed into an optical fiber having low numerical aperture, low core attenuation, and high pumping power absorption. The high concentrations of rare earth dopant material are accomplished through either the "hybrid vapor processing" (HVP) method or a "hybrid liquid processing" (HLP) method, each capable of being practiced in combination or independently of one another. The HVP method involves the vaporization of a rare earth halogen by the exposure thereof to a sufficiently elevated temperature, independently, or contemporaneously with the transport of the resultant rare earth halogen laden vapor, into a glass forming oxidation reaction zone on a flowing stream of essentially an unreactive inert gas, such as helium. According to the HLP method, a first amount of rare earth dopant is provided according to the HVP method and/or other vapor source of rare earth dopant which is mixed with glass forming vapors to form a deposited soot layer on the internal surface of a glass tube. The soot-deposited tube is then impregnated with a dopant solution which may be formulated with a second amount of rare earth dopant. The tube is then thermally collapsed resulting in an optical preform with a an enhanced amount of incorporated first and second amounts of rare earth dopant.

37 Claims, 7 Drawing Sheets

U.S. PATENT DOCUMENTS

| | | | |
|---|---|---|---|
| 4,334,903 | 6/1982 | MacChesney et al. | 65/3.12 |
| 4,417,911 * | 11/1983 | Cundy et al. | |
| 4,501,602 | 2/1985 | Miller et al. | 65/18.2 |
| 4,616,901 | 10/1986 | MacChesney et al. | 350/96.34 |
| 4,666,247 | 5/1987 | MacChesney et al. | 350/96.34 |
| 4,815,079 | 3/1989 | Snitzer et al. | 372/6 |
| 4,826,288 | 5/1989 | Mansfield et al. | 350/320 |
| 4,909,816 | 3/1990 | Mac Chesney et al. | 65/3.12 |
| 5,236,481 | 8/1993 | Berkey | 65/3.11 |
| 5,533,163 | 7/1996 | Muendel | 385/126 |
| 5,534,558 | 7/1996 | Minns | 522/35 |
| 5,609,665 | 3/1997 | Bruce et al. | 65/379 |
| 5,961,682 * | 10/1999 | Lee et al. | |

* cited by examiner

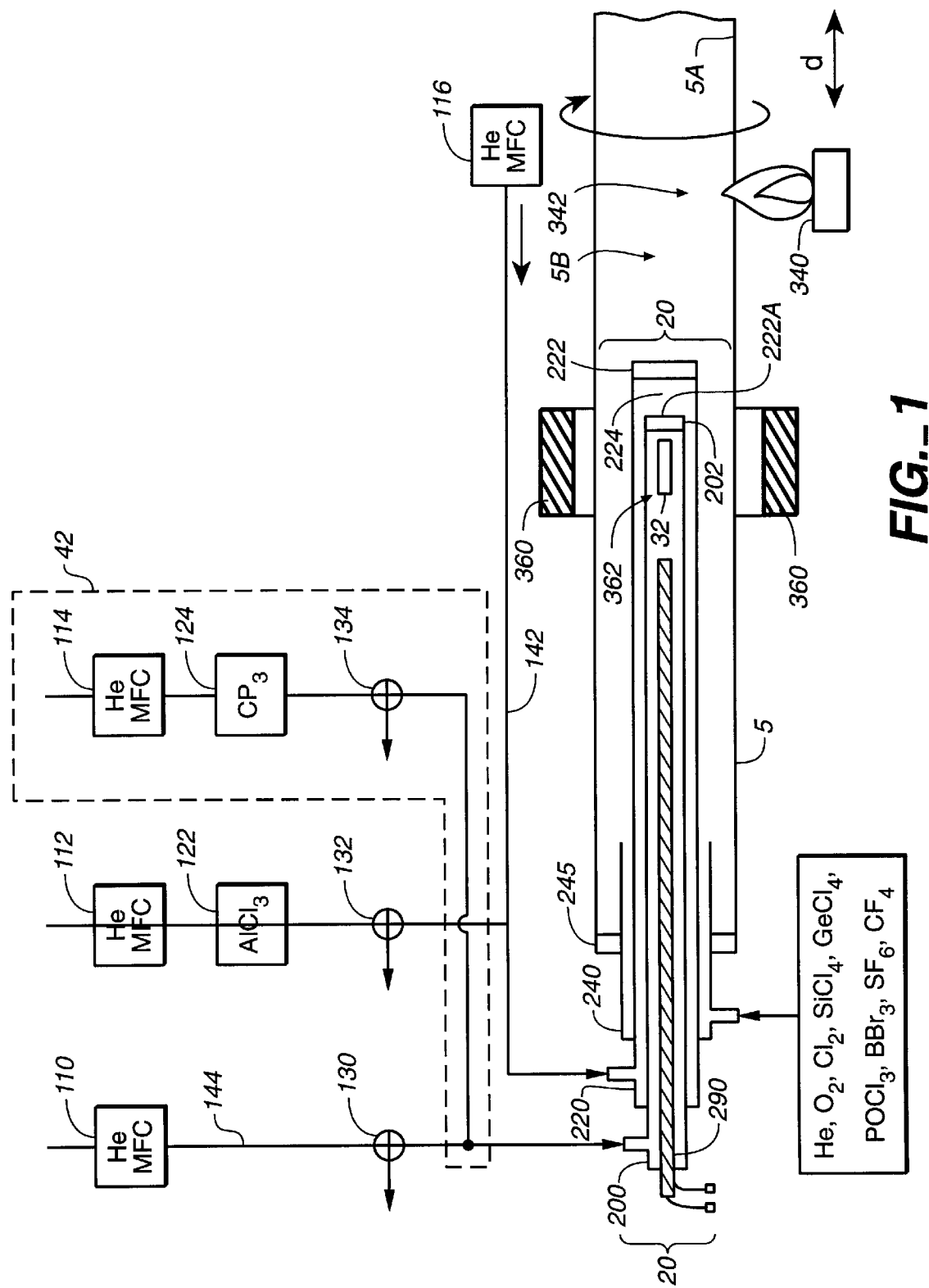
FIG._1

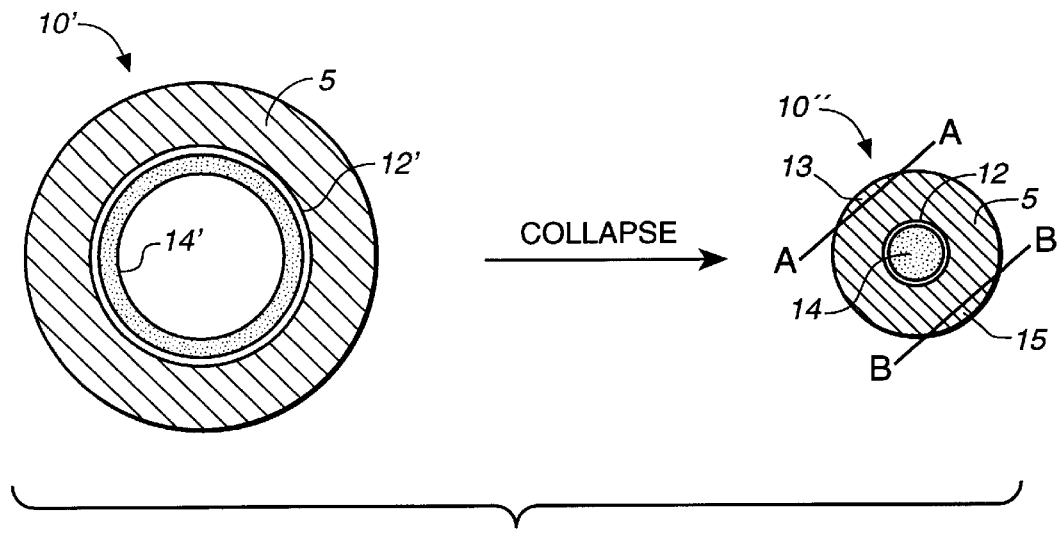
FIG._2
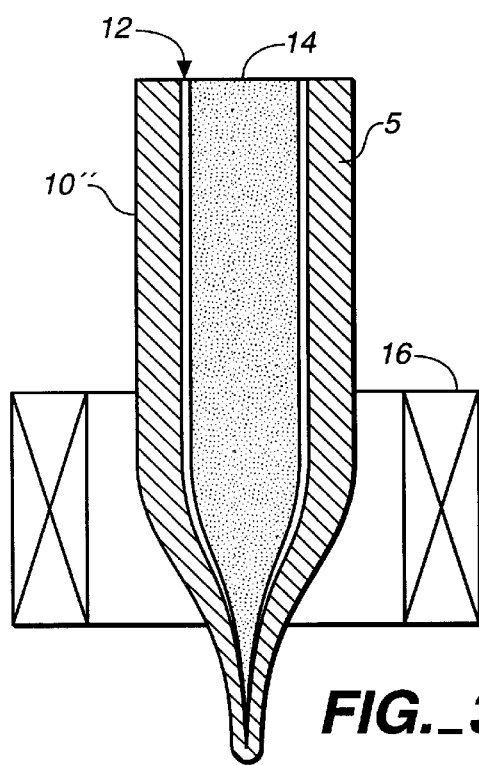
FIG._3A

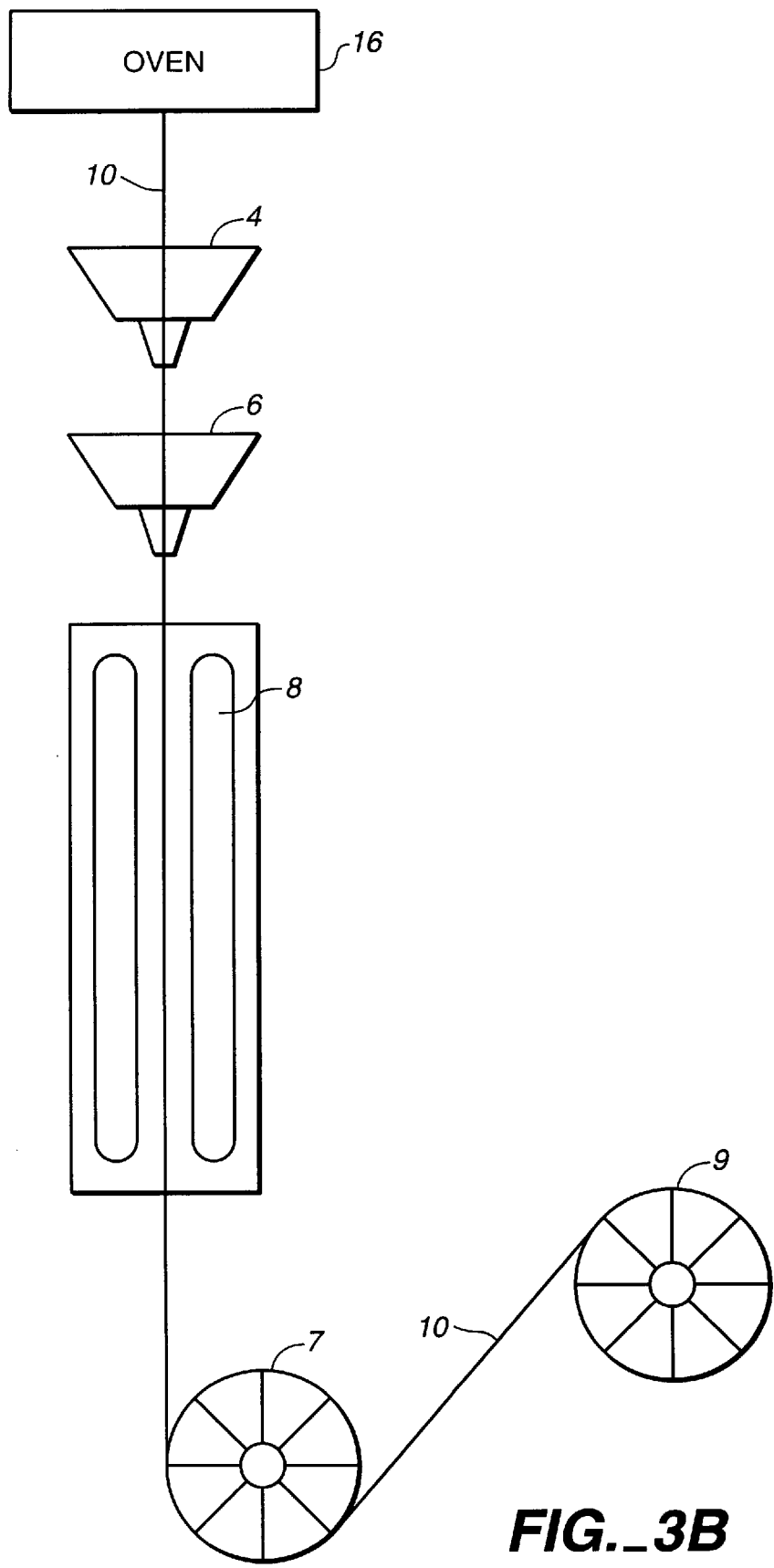
FIG._3B

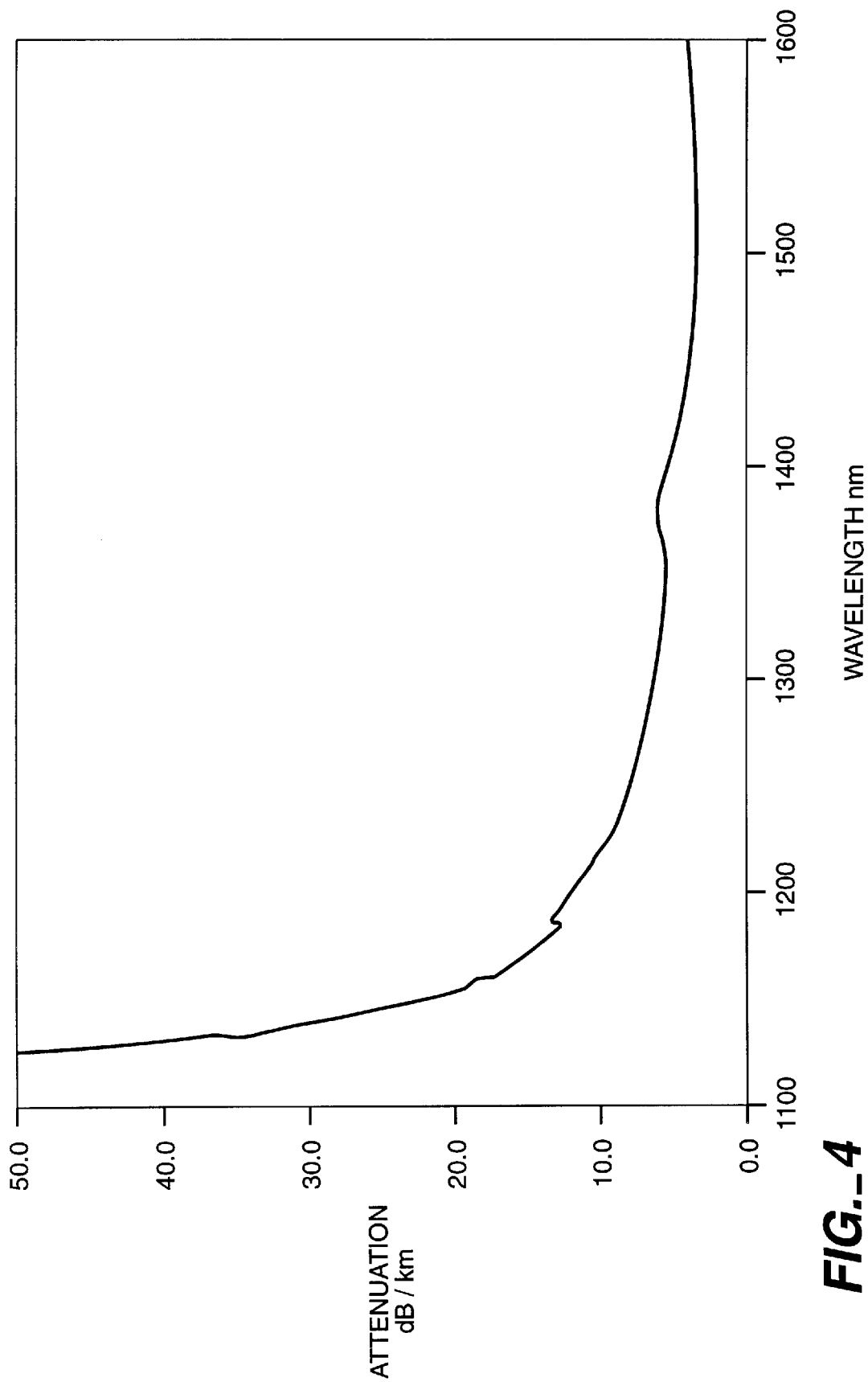
FIG._4

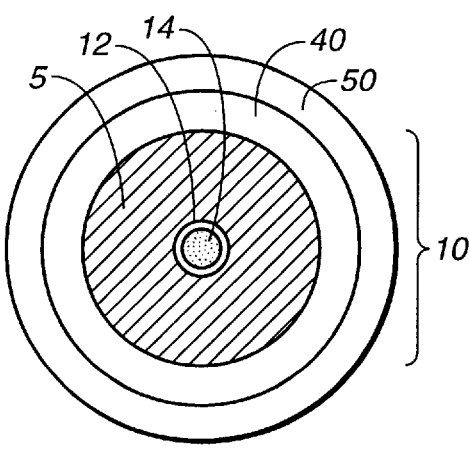
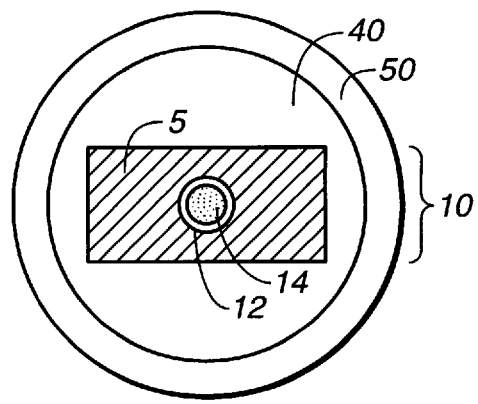
FIG._5A  FIG._5B
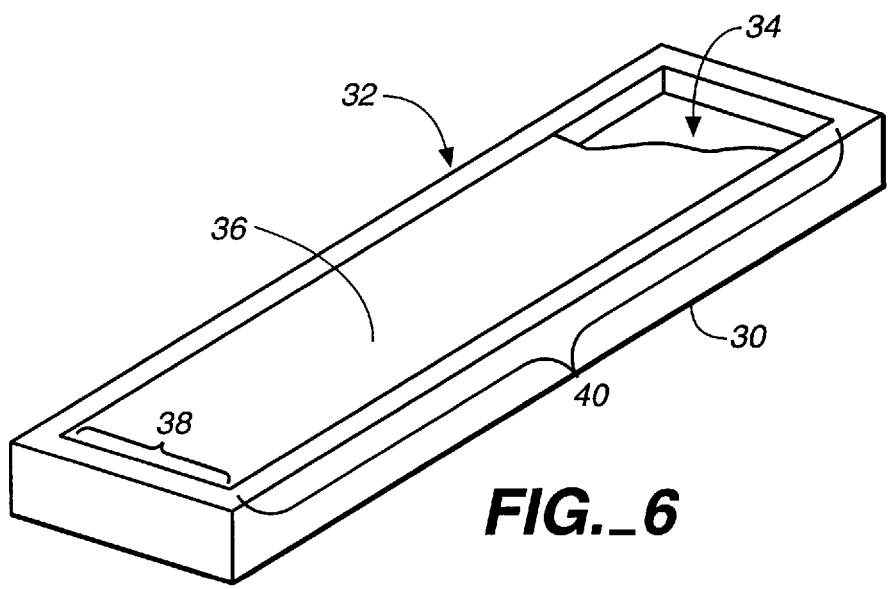
FIG._6

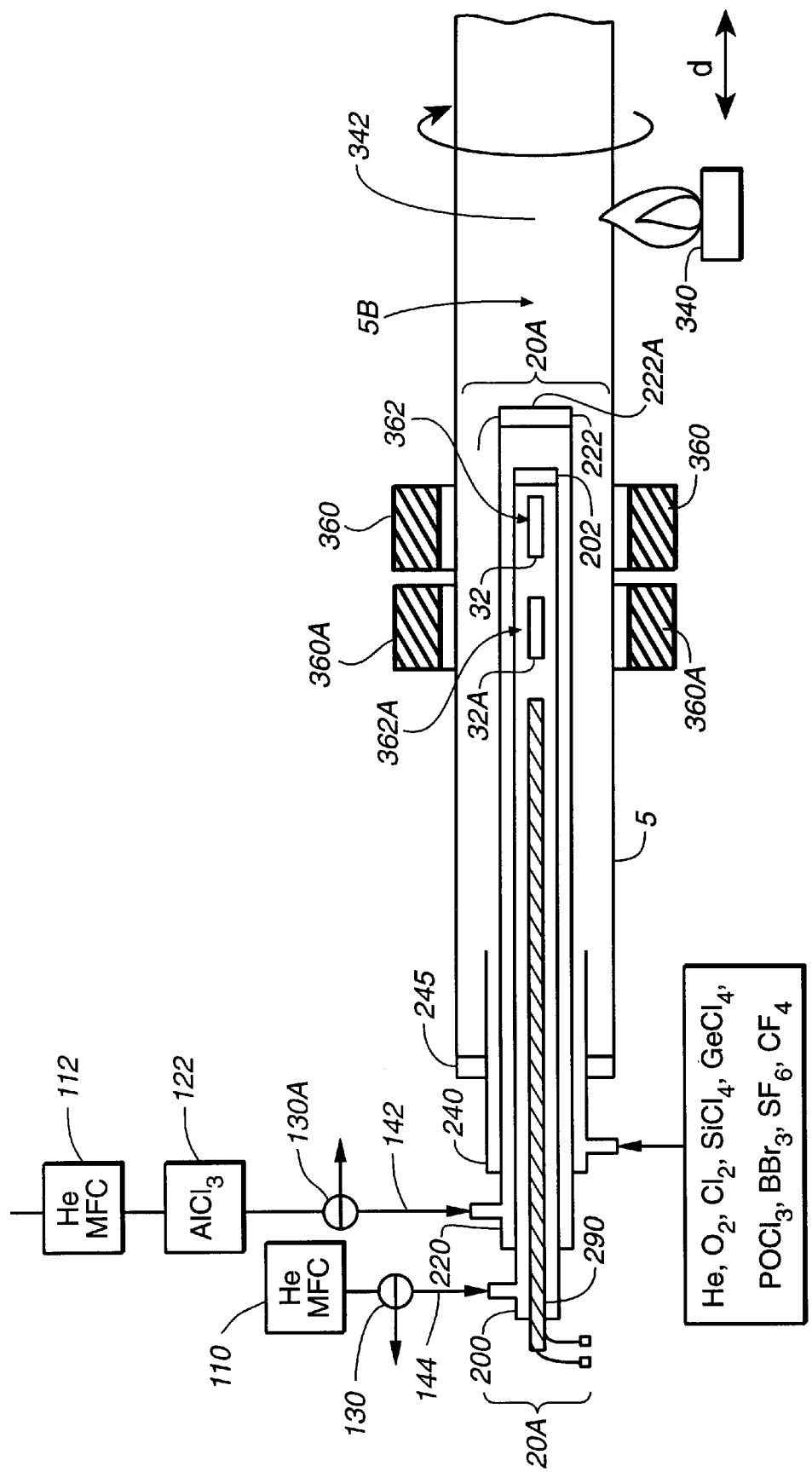
FIG._7

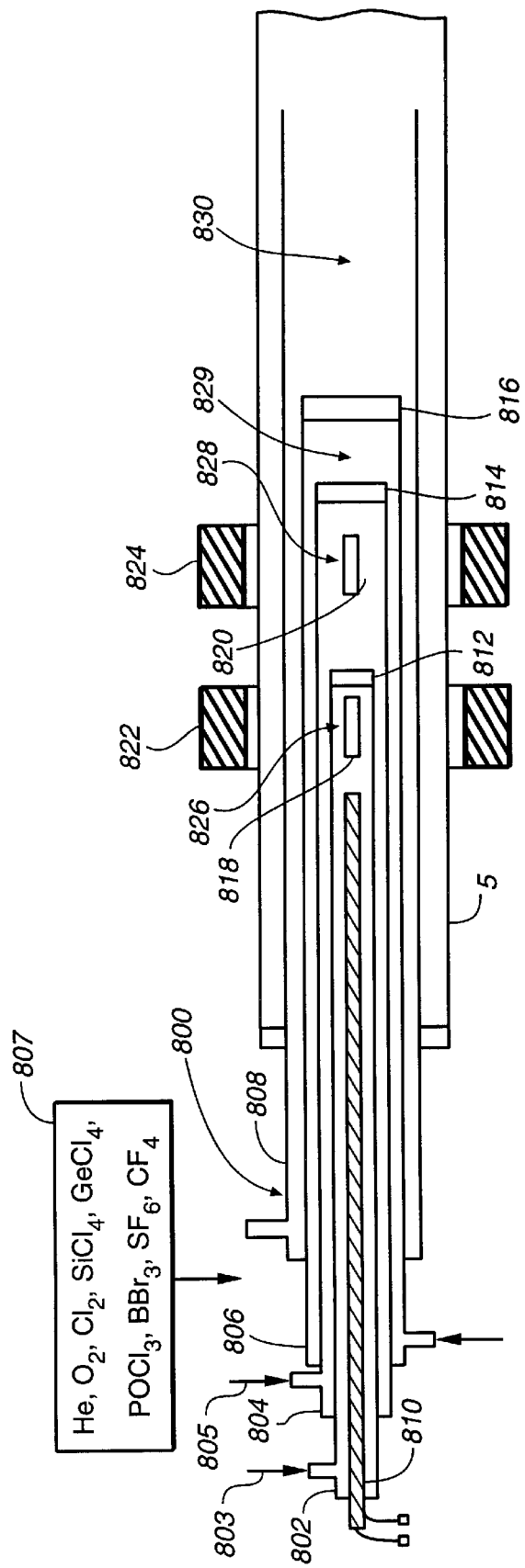
FIG._8

APPARATUS FOR THE MANUFACTURE OF GLASS PREFORMS

REFERENCE TO RELATED APPLICATION

This application claims priority benefits of prior filed, copending provisional patent application, Ser. No. 60/091,290, filed Jun. 30, 1998, which is incorporated herein by their reference.

FIELD OF THE INVENTION

This invention relates to a method and apparatus for the manufacture of an optical fiber preform having incorporated therein a predetermined and enhanced amount of rare earth dopant material, and particularly, wherein the rare earth dopant material is incorporated at a comparatively high concentration and with a cross-sectional geometry of the preform designed to promote good mode scrambling.

BACKGROUND OF THE INVENTION

Optical fibers are essentially ultra thin light conduits. Light is pumped into one end, propagates forward within and through the fiber, whether bent or straight, and ultimately emerges at the other end. By pumping light into the fiber in a predefined pattern, huge amounts of information can be communicated over large bandwidths over long geographic distances almost instantaneously (i.e., at the speed of light). Thin, fast, and robust, the utility of optical fibers is beyond question.

While the variety, forms, and complexity of fiberoptic configurations continue to evolve, the central underlying structure found in virtually all optical fibers is a light transmitting core surrounded by a cladding layer. The indices of refraction of the core and the cladding are adjusted during manufacture to provide the cladding with an index of refraction that is less than that of the core. When light is pumped into the fiber core, it encounters the refractive index differential at the core/cladding interface and in an optical phenomenon, also referred to as "continuous internal reflection", is "bent" back with little loss into the core, where it continues to propagate down the optical fiber.

In manufacture, an optical fiber is typically drawn from an optical fiber preform that essentially has the same cross-sectional geometrical arrangement of core and cladding components as that of the final optical fiber, but a diameter several orders of magnitude greater than that of the fiber. One end of the preform is heated in a furnace to a soft pliable plastic consistency, then drawn lengthwise into a fiber having the desired fiber core/cladding dimension.

In the art of fiber preform manufacture for transmission fibers, as opposed to the manufacture of active fibers, i.e., fibers with rare earth doped cores in single mode or double clad fibers, techniques have been developed for high speed manufacture to reduce costs while providing high quality fiber using chemical deposition processes where constituents in their vapor phase are supplied to a horizontally rotated refractory tube to form one or more inner glass layers on the inside surfaces of the tube. Examples are the Mac-Chesney at al. patent 4,909,816 and its companion patents, 4,217,027 and 4,334,903, disclosing what is referred to as the modified chemical vapor deposition (MCVD) process, named as such to distinguish it from general semiconductor type CVD processes as well as from prior CVD process employed for the manufacture of glass preforms. These patents discusses the so called "soot" or outside vapor deposition (OVD) process, disclosed in U.S. Pat. Nos. 3,775,075 and 3,826,560, which process is enhanced by the use of the MCVD process. Patent '816 relates to the establishment of a more prominate homogeneous reaction where the reaction product from the vapor phase forms glass precursor particulates within the gas stream within the ambient of the refractory tube which particulates are then subsequently deposited downstream of the heat zone or source on the inner surface of the tube. The deposited particulates are then consolidated into a transparent glass layer on the tube surface by the passing heat zone. This is distinguished from previously employed CVD processes for glass preforms where a heterogeneous process is explained to occur with glass particulates initially formed on the inner surface of the refractory tube forming either a soot layer that is subsequently sintered to form a glass layer or directly forming a glass layer resulting in deposited formation of monolithic glass, as opposed to glass particulates initially formed within the ambient of the glass refractory tube. The homogeneous reaction of the MCVD process is accomplished, in a significant manner, by increasing the temperature of the reaction zone via the hot moving zone. The advantage of the MCVD approach over the OVD process is eliminating hydrogen bearing components, water vapor and other contaminants from the deposited glass layer. The MCVD process is explained briefly in Andrejco et al. U.S. Pat. No. 4,257,797 and is explained in detail in the book entitled *"Optical Fiber Communications"*, Vol. 1, Fiber Fabrication, edited by Tingye Li, 1985 (Academic Press, Inc.), in particular, at pages 1–64, which is incorporated herein by reference.

From the point of view of patent '816, higher productivity of glass preforms for large scale fiber production, via subsequent fiber drawing, can be achieved by providing a continuous, unbroken processing procedure which includes increasing the reaction temperature for glass layer formation, increasing the rate of tube rotation, sintering the deposited glass layer, minimizing the effects of hydration contamination from the deposited glass layer while rotating and collapsing the tube to form the preform. While the high speed process approach may be highly applicable to manufacture transmission fiber, it is not a preferred approach to the manufacture of active fiber, particularly where high levels of a rare earth dopant or codopants are desired for incorporation in the deposited layer or layers on the inner surface of the refractory tube. Active optical fibers are employed as fiber gain media for purpose of signal amplification of fiber laser applications and are comprised of a single mode fiber or a double clad fiber with a core composition doped with 4f rare earth elements (i.e., the lanthanide series of element, atomic numbers 57–71), e.g. erbium or ytterbium or co-doped with erbium and ytterbium. By selective use of particular concentrations and/or mixes of rare earth dopants, the spectral absorptivity of the core to certain wavelength ranges of light can be defined to desired specifications. An appropriately tuned core, surrounded with an appropriate cladding configuration, can provide, in combination with an appropriate pump source, the basis for light lasing and/or light amplifying functionality. In consideration, for example, of the need for signal amplification in fiberoptic telecommunication projects, optical fibers capable of such light intensifying functionality are desirable. Unfortunately, rare earth doping is not easy performed, particularly at high levels of concentrations in the core.

Various methods and variation have been developed for fabricating rare earth doped optical fiber preforms. Some examples of these methods are disclosed in U.S. Pat. No.

4,501,602, issued to Miller et al. on Feb. 26, 1985; U.S. Pat. No. 4,616,901, issued to MacChesney et al. on Oct. 14, 1986; U.S. Pat. No. 5,236,481, issued to Berkey on Aug. 17, 1993; U.S. Pat. No. 5,609,665, issued to Bruce et al. on Mar. 11, 1997; U.S. Pat. No. 4,501,602, issued to Miller et al. on Feb. 26, 1985; U.S. Pat. No. 4,826,288, issued to Mansfield et al. on May 2, 1989. Regardless, under current practice, it is very difficult to incorporate high concentrations of rare earth dopants at limited total doping levels, particularly, in the case of the popular rare earth element neodymium (Nd).

Part of the problem is the need in one of the most commonly-practiced preform manufacturing methodologies, i.e., MCVD, to generate and deposit as layer a vapor laden with rare earth dopant. Under current practice, it is difficult to generate anything other than relatively low vapor pressures, resulting ultimately in the incorporation of correspondingly low concentrations of rare earth dopant. Without the ability to attain a high rare earth dopant concentration, one cannot produce an optical fiber with a low numerical aperture, a low core attenuation, and high pumping power absorption, all of which are desired criteria in the design of fiberoptic lasers and amplifiers.

Additionally, in regard specifically to fiberoptic lasers, even if a suitable fiber optic preform is made, the lasing efficiency of a fiber drawn therefrom may still suffer in other respects. The performance of fiber lasers, as in any active or nonlinear waveguide, is related intimately to the efficiency with which pump radiation can be absorbed by the active material in the fiber core. In the earliest fiber lasers, an appreciable amount of the radiant energy pumped into the fiber would not pass into the core, and, thus, did not contribute to the core's lasing effect. In response, various cross-sectional fiberoptic geometries, in particular, pertaining to the cross-sectional geometry of the inner cladding of a double clad fiber, were successfully developed that are capable of effecting patterns of internal reflection having a greater frequency of core interactions with light propagating along the inner cladding and criss-crossing and being absorbed in the doped core. See, for example, U.S. Pat. No. 4,815,079, to Snitzer et al. issued Mar. 21, 1989; and U.S. Pat. No. 5,533,163, to M. H. Muendel issued Jul. 2, 1996. However, designing a fiber on the basis of such learning requires additional manufacturing steps in the preform formation. Any improvement that would reduce the burden of these additional steps with the enhancement of light scattering in the inner cladding for enhancing absorption in the fiber core would be desirable.

SUMMARY OF THE INVENTION

According to this invention, a methodology and apparatus for the manufacture of an optical fiber preform is provided having incorporated therein a comparatively high concentration of rare earth dopant material, and which thus can be drawn and processed into an optical fiber having low numerical aperture, low core attenuation, and high pumping power absorption. The high concentrations of rare earth dopant material are attained in the practice through the employment of either what we refer to as the "hybrid vapor processing" (HVP) method or a "hybrid liquid processing" (HLP) method, each capable of being practiced in combination or independently of one another. The methods of application and the apparatus to practice the methods herein are applicable to formation of glass performs for most types of fiber geometry, including single mode fiber and double clad fiber, having high optical homogeneity. The HVP method involves the vaporization of a solid state form of a rare earth chloride by the exposure thereof to a sufficiently elevated temperature, contemporaneously with the transport of the resultant rare earth chloride laden vapor into an oxidation reaction zone within the bore of a hollow refractory tube on a flowing stream of essentially unreactive inert gas, such as helium. A vapor of glass forming material, e.g., $SiCl_2$, is introduced contemporaneously into the reaction zone. By regulating the temperature of the reaction zone, one or more layers of glass, whether deposited in the form of a soot layer, or as a monolithic, sintered glass layer can be directly deposited as in the case taught in patent 4,909,816 and some earlier patents. The soot layer is deposited on the inner surface of the bore of the refractory tube by oxidation of constituents comprising the rare earth chloride laden vapor and the vapor of glass forming material. The hollow tube is thereafter collapsed to form the optical fiber preform.

As used herein, the term, "soot layer", is a deposited layer having a large amount of porosity and is not fully sintered to form a glass or amorphous layer and, therefore, lacking any optical transparency, optical properties and homogeneity as found in monolithic glass layer formed after a high temperature sintering step.

An important feature of the HVP method is the employment of a rare earth dopant deliver system that provides for rare earth laden vapor from its solid state form in advance of mixing with oxygen or oxides of glass forming materials introduced in the vapor phase deposition (VPD) process. In other prior art methods, such as disclosed in patent 4,909,816 and its companion patents, the rare earth vapor comes in contact almost immediately with oxygen or oxides thereof. We have found that this has a definite and profound effect on the uniformity of constituents in the deposited soot layer deposited on the inside of the refractory tube. There is not a uniform incorporation of the rare earth component on a continuous, repeatable basis let alone the incorporation of intermediates that function as homogenizers. The HVP method of this invention provides for uniform, repeatable incorporation of rare earth and/or intermediate components with comparatively high levels of concentration through the employment of the novel delivery system of this invention forming a layer of high optical homogeneity. By high optical homogeneity, we mean that the resultant layer of deposited and sintered monolithic glass that has irregularities in the deposited glass material less than about 2 $\mu$m in width or less. Anything larger than this is referred as having heterogeneity and considered unacceptable in that the glass material has not been fully reacted and undergone a sufficient transformation into an amorphous, monolithic glass layer with uniform mixed glass components including intermediates and rare earth dopant uniformity.

The HLP method involves the method of depositing a glass layer or layers containing a first amount of rare earth dopant material on the inner surface of a refractory tube forming a soot layer or layers on the internal surface. The layer or layers are deposited at a temperature to provide a soot consistency with multiple pores without transformation into a continuous monolithic glass layer. This step may be carried out employing the HVP method or employing a standard VPD process of the prior art. In either case, the soot-deposited refractory tube is then removed from the preform lath and impregnated with a dopant solution formulated with a second amount of rare earth dopant material. The tube is then return to the preform lath, heated to sinter the doped impregnated layer or layers and thereafter collapsed, resulting in an optical fiber preform with a final amount of rare earth dopant material that includes substantially both the first and second amounts of rare earth dopant material.

An optical fiber preform made according to the HVP or the HLP method can be employed with its geometry as formed, or the preform geometry may be modified before the preform is drawn into fiber to introduce deviations in the optical properties of the glass preform, e.g., a light scattering mechanism. Mechanical grinding or a chemical process may be employed to form a simple flat or concave surface on at least one longitudinal surface of the preform. These are quite suitable for changing the preform geometry prior to the fiber drawing process and the formation of an outer cladding layer as in the case of drawing a double clad preform or a sleeve as may be the case in drawing a single mode fiber. More than one flat can be applied to the preform such as on opposed longitudinal surfaces of the glass preform.

In light of the above, it is principal object of this invention is to provide improved methodology and apparatus for the manufacture of an optical fiber preform having a comparatively high rare earth dopant concentration, particularly, wherein the limited total doping concentration of the glass fiber preform is at a level sufficient to effect a low numerical aperture in an optical fiber prepared therefrom.

It is another object of this invention to provide a method of manufacturing of an optical fiber preform wherein enhanced, higher levels of incorporation of a rare earth dopant or dopants is achieved by the vaporization of a solid state form source of a rare earth material in close proximity to the region of deposition of the glass forming material on the inner surface of a rotated refractory tube. More than one such rare earth source may be employed respectively providing different vapor laden rare earth dopants to the reaction zone within the refractory tube.

It is another object of this invention to provide a method of manufacturing an optical fiber preform wherein the incorporation therein of rare earth dopant material is effected by performing a soot layer deposition rare earth vapor doping followed by rare earth solution doping.

It is a further object of this invention to provide a method of manufacturing an optical fiber preform, the method characterized by a vapor phase deposition process having means employed therein for reducing the incidence of premature particle-creating oxidation reactions, and thus, ultimately better suited for formation of uniform layer or layers of monolithic glass.

It is a still further object of this invention to provide an method of manufacturing an optical fiber preform, wherein said method is comparatively less susceptible to water contamination, which is often traceable to the inherent moisture sensitivity of halogen-based dopant materials (e.g., aluminum chlorides, rare earth chlorides, etc.) commonly used in preform manufacture.

It is an additional object of this invention to provide a method of manufacturing an optical fiber preform, wherein said method employs a rare earth cyclopentadienide ($CP_3$) and/or derivatives as dopant material.

It is still another object of this invention to provide a method of manufacturing an optical 5 fiber preform, wherein, among other steps, a solid state form of a rare earth halogen, i.e., a rare earth chloride, is vaporized by exposure to a sufficiently elevated temperature, and transported on a flowing stream of essentially unreactive inert gas (e.g., helium) to an oxidation reaction zone, contemporaneously with the introduction thereto of vaporous glass forming material.

It is another object of this invention to provide a method of modifying an optical fiber preform by introducing deviations in the preform geometry to change its optical characteristics.

The foregoing and other features and advantages of the invention will be apparent from the following, more particular description of several preferred embodiments of the invention, as illustrated in the accompanying drawings.

BRIEF DESCRIPTION OF THE DRAWINGS

FIG. 1 is a schematic illustration of a vapor phase deposition (VPD) apparatus for depositing layer or layers of soot or amorphous, monolithic glass on the inner surface of a hollow support refractory tube in the practice of the methods according to this invention.

FIG. 2 is a cross-sectional schematic illustration of an optical fiber preform made in accordance with an embodiment of this invention, and is subsequently collapsed into a glass preform.

FIG. 3A is a schematic illustration of the drawing of a glass preform into an optical fiber.

FIG. 3B is a schematic illustration of an apparatus for coating additional cladding material and/or polymeric protective layer(s) onto the drawn optical fiber of FIG. 3A.

FIG. 4 is a graph illustration of attenuation data versus wavelength for an optical fiber made in accordance with an embodiment of this invention.

FIG. 5A is a cross-sectional schematic illustration of a double clad optical fiber made in accordance with an embodiment of this invention.

FIG. 5B is a cross-sectional schematic illustration of another double clad optical fiber made in accordance with another embodiment of this invention.

FIG. 6 is perspective view of a rare earth chloride vessel or boat useful in the practice of an embodiment of this invention.

FIG. 7 is a first modified version of the glass tube delivery system of FIG. 1.

FIG. 8 is a second modified version of the glass tube delivery system of FIG. 1.

DETAILED DESCRIPTION OF THE PREFERRED EMBODIMENTS

Applicability of the present invention is directed to the manufacture of performs drawn to form double clad fibers but equally suitable for manufacture of preforms for other type of fibers including single mode fibers or multimode fibers. In particular, since the methods disclosed are concerned with the enhancement of rare earth doping, such in the fiber core, the embodiments of the invention have particular adaptability to single and double clad fiber utilized as active gain media, e.g., as fiber amplifiers or fiber lasers. For purposes of explanation, representative examples of fiber gain media are illustrated in FIGS. 5A and 5B. However, the principal of the methods employed herein are also applicable to enhancement of other constituents or components in fiber glass preforms, other than just rare earth enhancement, where such a constituent or component is enhanced by the methodology of either or both the HVP or HLP method. An example is the enhancement of phosphatic incorporation in the glass forming layer deposited on the inner tube surface, beside or in lieu of a rare earth component.

As shown in cross-section in FIGS. 5A and 5B, a double clad fiber, useful for high power fiber amplifier or laser applications, comprises a core 14, an inner cladding 5, an outer cladding 40, and an optional protective outer jacket 50. Optionally, the double clad fiber design may include an additional inner cladding layer 12 having a comparatively thin cross section forming an interface between core 14 and cladding 5. The portion of the fiber that this drawn from a glass preform, such as preform 10" in FIG. 2, is designated at 10 in FIGS. 5A and 5B.

When the index of refraction $n_1$ of core 14 is larger than the index of refraction $n_2$ of inner cladding 5, propagating radiation can be largely confined within core 14 by means of total internal reflection. Inner cladding 5 functions as a waveguide by means of internal reflection of the radiation occurring at the interface lying between inner cladding 5, with an index of refraction $n_2$, and outer cladding 40, with a lower index of refraction $n_3$. The purpose of inner cladding is to confine radiation launched into the inner cladding so that it repeatedly intersects the core 14 as it propagates along the length of the fiber. With each such intersection with core 14, a portion of this radiation, which is also referred to as pump light, is absorbed by an active gain dopant (e.g., rare earth dopant) incorporated in core 14. The length of an optical fiber is typically tens, or possibly hundreds, of meters allowing for a large number of these core interaction permitting as much as possible the absorption of the pump radiation with the core.

While current double clad fiber lasers produce good results, it has been found that such good results can be either improved and/or more cost-effectively accomplished by (1) increasing the concentration of the active gain dopant material (e.g., rare earth dopant material) in the fiber's core, and/or by (2) designing a simple fiber geometry to promote the occurrence of an acceptably high frequency of light absorbing interactions at the fiber's single mode core.

Although the finished double clad fiber laser is the product of ultimate concern, the embodiments of the present invention focus on the design and manufacture of the optical fiber preform 10" from which the central optical strand 10 of the fiber is drawn, i.e., a strand comprising the fiber core and inner cladding structure. As is well known in the art, the structural and compositional configuration of the rod-like preform 10", though reduced greatly in cross-sectional diameter, can be translated accurately into the much longer filamentary fiber 10 as drawn from preform 10".

We have discovered that high concentrations of active gain, rare earth dopant material can be incorporated into an optical fiber preform either by a method involving the delivery of rare earth halogens to a glass forming reaction zone under high vapor pressures and substantially free of oxides and moisture content (i.e., the hybrid vapor processing or HVP method), or by a method involving an innovative combination of soot deposition and solution doping processing (i.e., the hybrid liquid processing or HLP method). Either of these methods are capable of being used alone or in combination with one another.

According to the HVP method of this invention, an oxidizable rare earth halogen, such as a rare earth chloride vapor having desirably higher vapor pressure is directly produced by vaporizing, in the presence of high temperature in an environment free and regulated from oxygen and moisture free, a solid form of the rare earth halogen. This streamlined process provides advantages with respect to efficiency, uniformity, and concentration yield that cannot be easily duplicated when oxidizable rare earth, for example, vapors are generated in the multi-step processes common among the prior art such as disclosed, e.g., in U.S. Pat. No. 4,616,901, to MacChesney et al.

As shown in FIG. 1, the vapor phase deposition (VPD) apparatus of this invention employs a novel designed delivery system 20 comprising a plurality of multi-concentric quartz glass tubes 200, 220, and 240 supported and sealed within the quartz tube 5 at 245, with a forward flow/anti-back flow regulator 202 and 222, e.g., a permeable quartz glass frit interface or other such inert permeable material, sealing the output end of each of the inner concentric delivery tubes 200 and 220. In essence, the multi-concentric delivery system 20 of the HVP apparatus comprising this invention allows for the regulated delivery of various vapor laden gaseous material into the bore of quartz tube 5 without back flow contamination by oxygen being provided via outer concentric delivery tube 240. In this manner, the uncontaminated vapors of refractive index and rare earth dopants provided from delivery tubes 200 and 220 are first reacted under the influence of burner 340 in a definable reaction zone 5B along the length of tube 5 with other gases and vapor laden glass forming components via outer delivery tube 240 for forming on inner surface 5A one or more layers of monolithic glass or other particulate or soot layers.

The VPD apparatus is flexible in allowing, with minor modification, for the carrying out of various vapor phase deposition procedures. For example, in the conduct of a HVP method, assembly 42 is shut-off, isolated, removed, or otherwise taken "off-line", and a solid form of a rare earth halogen, such as a rare earth chloride, is loaded into a vessel or boat 32 positioned inside central delivery tube 200. Alternatively, in further enhancing the incorporation of rare earth materials into the deposited glass or soot layers, vapor rare earth supply source 42 may be activated or placed "on-line" in combination with the vaporization of rare earth chloride from boat 32. However, it should be understood that either of these rare earth chloride supply sources can be employed without the other.

An important attribute of this invention is the use of rare earth chloride boat. It should be noted at the outset that the use of solid forms of rare earth materials to be transformed into a liquid form as a vapor under high vapor pressure is not per se new. For example, in MacChesney et al. U.S. Pat. No. 4,666,247, a fused silica quartz tubular chamber 24 contains a rare earth power or liquid constituent ($NdCl_3$) heated to about 1,000° C. by heater 18 in essentially an oxygen free ambient due to the use of silica wool 25 placed at the output end of chamber 24 which prevents the entrance of contaminants into chamber 24. The difficulty with this approach, however, is that as the rare earth material is spent in carrying out the process, the surface area of the chunk, pile or irregular form of the rare earth would change over time, and, as a result, the concentration of rare earth dopant introduced into the process correspondingly changes over time. The same is is true relative to a liquid pool of rare earth with unmaintained boundaries. The total quantity of rare earth in its vapor form is a function of temperature, vapor pressure at a given temperature and surface area of the exposed form of the rare earth constituent. In the case of a fused tube chamber shown in patent 4,666,247 employing a powder or liquid form of the rare earth constituent, there is an ever changing exposed surface area since as the solid or liquid phase of the constituent is dissipated, the total surface area will be reduced. Therefore, in order to control the uniformity of vaporized rare earth provided over time, a removable boat 32 is employed that, as shown in FIG. 6, has a cavity 34 which has a two dimensional width 38 and length 40 will be constant as the rare earth solid material 36 is dissipated over time. As a result, constant vaporized surface area remains throughout the life of the rare earth material present in boat 32 until replaced by another boat which is not possible in patent 4,666,247. By loading the rare earth material 36 into the cavity 34 of the quartz boat 32, as a vapor phase deposition process can be carried out over several runs and the exposed surface area subject to being vaporized will stay essentially the same, thus assuring reliable "batch-to-batch" uniformity.

In order to prepare boat 32 for use in delivery system 20, a melt of rare earth powder is prepared within cavity 34 to form a solid integral form of the rare earth chloride with the dimensions 38 and 40 of boat 32. This preparation is carried out in an inert ambient, without oxygen, such as helium, at around 900° C., for example. In the process of preparation, first, the boat is placed in a hermetically sealed chamber containing a powder form the rare earth, e.g., Yb. Then, the chamber is provided with a halide gas, e.g., $Cl_2$, and an inert carrier gas, e.g., He. The temperature of the chamber is elevated to around 500° C. or so to drive off an carry away via a chamber exhaust system, water vapor and oxygen according to following formula:

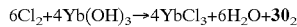

$$6Cl_2+4Yb(OH)_3 \rightarrow 4YbCl_3+6H_2O+3O_2$$

This form of the rare earth is high desirable since it provides for low vapor pressure that does not include oxygen. The inclusion of or presence of oxygen in rare earth will increase its vapor pressure.

The temperature of the boat is raised further to about 900° C. to melt the rare earth powder and provide an exposed surface having a two dimension of 38 and 40 as shown in FIG. 6. The prepared rare earth boat is then permitted to cool and transferred directly for placement within delivery tube 200 to prevent any prolonged exposure to an oxidizing atmosphere. Boat 32 is inserted in the downstream end of tube by removal of flow/anti-back flow interface 202 and its replacement with the same interface, or a new regulator if the older one is significantly obstructed by significant deposits of oxides on its outer surface, after insertion of boat 32 within the tube end. After interface placement and re-assembly of delivery system 20, an inert gas flow is initiated with heater 360 operated at a low temperature (500° C.) to remove any moisture and oxygen absorbed during the transfer to delivery system 20. Then, for generation and delivery of a vapor form of the rare earth from boat 32, heating source is taken up to a temperature of about 1,000° C. or so to provide a high vapor form of the rare earth carried by the inert gas, helium. Thus, the process of provided a low vapor pressure solid source for the rare earth constituent is provided without any contamination with moisture or oxygen.

A previously used boat can be recharged with rare earth material by adding additional rare earth material to the remaining rare material in the boat, dehydrating and deoxidizing the recharged boat and thereafter melting the rare earth material to integrate the material as a single mass.

As shown in FIG. 1, an inert carrier gas, such as helium, is injected from a source, not shown, through mass flow controllers 112 and 114, respectively, into reservoirs, feeders or columns 122 and 124. Mass flow controllers are electronic flow regulating gas sources well known in the art. Columns 122 and 124 serve as sources of various kinds of vapor laden gases. In the embodiment illustrated, column 122 is a source of an intermediate (homogenizer) such as a $AlCl_3$ vapor, which is an refractive index modifying material. Other intermediates or combinations of intermediates may be employed such as Ga, In, As and/or Sb halide vapors. These intermediates provide for homogeneity in the mixing of constituents in the glass forming process. Only a single intermediate source is shown here for simplicity, but it should be understood that combination or other such sources may be employed with an inert carrier gas from controller 116. Column 124 is a rare earth containing rare earth chelate vapor source. As shown, one particularly useful rare earth containing vapor is a "rare earth"-cyclopentadienyl ($RE$-$CP_3$) vapor, e.g., $Yb(C_5H_5)_3$ or $Er(C_5H_5)_3$ or a combination of such rare earth vapors. The chemical formula of the "rare earth"-cyclopentadienyl compound is $RCP_3$ where $CP_3$ may be the hydrocarbon $(C_5H_5)_3$ and R is a rare earth element, such as, but not limited to, neodymium (Nd), ytterbium (Yb), erbium (Er), thulium (Tm), holmium (Ho), and samarium (Sm). Neodymium cyclopentadienyl vapor is favorable as a rare earth chelate vapor source 124 in that can be oxidized at temperatures greater than 1,000° C. to form a useful active gain, Nd-cyclopentadienide dopant.

Columns 122 and 124 preferably are heated to a maximum temperature in the area of about 220° C. Of course, different temperatures may be needed for different rare earth material due to differences in vapor pressure for each of the different rare earth compounds.

As illustrated in FIG. 1, the vapor phase of these source materials from of columns 122 and 124 are provide to delivery system 20 respectively via three way stopcocks 132 and 134.

Additional inert carrier gas, e.g. helium, may be supplied from controller 110 via line 144 and stopcock 130 to regulate the amount of inert gas to provided to delivery tube 200.

Stopcocks 132 and 134 have vents for venting the intermediate ($AlCl_3$) and rare earth chelate vapors, respectively, as columns 122 and 124 are brought to a desired equilibrium gas flow and temperature condition prior to diversion of the vapor stream into the transport line leading to the CVD reactor comprising rotated tube 5 and its heating zone. Stopcocks 132 and 134, being independently controllable, are used to divert a desired mix of vapor streams into the reactor system when deposition of the rare earth containing soot begins, as well as shut off the vapor supply at the end of the required deposition.

The vapor materials which enter transport lines 142 and 144 are transported therein by an inert carrier gas, for example, helium, which enters lines 142 and 144 through mass flow controllers 116 and 110, respectively. Such transport lines are well known in the art. For example, transport lines 142 and 144 comprise a 0.25 inch (0.63 cm) diameter Teflon® lines surrounded by a 1.5 inch (3.8 cm) copper tube. The temperature of transport lines 142 and 144 is maintained at a temperature which is sufficiently high that the vapor materials being transported do not condense therein. In this regard, one can use a thermocouple temperature sensor to control the temperature in transport lines 142 and 144 to within about 2° C. to 3° C. This should provide sufficient accuracy to control the temperature and vapor pressure of the vapor materials transported therein to ensure stability.

Transport lines 142 and 144 are respectively coupled to separate concentric delivery tubes 220 and 200, of delivery and reactor system 20. A mixture of unheated gases from sources (not shown but well known in the art) enter outer concentric delivery tube 240. In the illustrated example of FIG. 1, the mixture of gases comprise He, $O_2$, $Cl_2$, $SiCl_4$, $GeCl_4$, $POCl_3$, $BBr_3$, $SF_6$, and $CF_4$. Other gases, as known in the art, may possibly be $SiO_2$, $P_2O_5$, $AlO_3$, MgO, CaO or $K_2O$. Generally, active fibers will employ either Al or P as index altering components, but such elements are not always employed in the manufacture of transmission fiber. These gases can be introduced into delivery tube 240 in a mixture because they will not react at the temperature of tube 240 at the upstream extent of delivery system 20 and reaction zone 5A. Central of concentric delivery tubes 200, 220 and 240 is a central heating element 290 for initially heating the gas vapors as they enter the tubes via their inputs at the rearward extent of each of these tubes which also prevents substantial premature thermal decomposition or pyrolysis of these component vapor laden gases on the tube walls.

As previously indicated, the down stream end of inner delivery tube includes a support vessel or boat 32 for holding a solid form of an element or compound to vaporized in a gaseous state by means of the application of high temperature in a high temperature zone 362 that includes boat 32 within tube 200. The heat zone 362 is created by another heating element 360 which is axially disposed about the concentric tubes 200, 220, 240 as well as refractory tube 5 of system 20. Any type of well known heating element can be employed, e.g., a rf coil arranged about the concentric tubes, may be employed as a heater and the boat 32 of a material high absorptive of the rf radiation. An example employed is a coaxially circumscribing heating element 360 comprising a nichrome wire wrapped on a small bore alumina tube, which was found adequate for performing the task of vaporizing a rare earth element in boat 32. Due to the concentricity of their arrangement, the temperature in the innermost delivery tube 200, being closest to the thermal focus of heating element 360, is the highest, and the temperature in outermost chamber 240, being furthest from the thermal focus of heater 360, is the lowest among the several delivery tubes 200, 220, and 240. Thus, when the rare earth con-taming vapors are introduced from source 42 and are transported through central delivery tube 200, these vapors will encounter the high temperatures at zone 362, e.g., in the range of about 800° C. to about 1,200° C., to effect the high vapor pressures appropriate for achieving a uniform incorporation of rare earth elements on surface 5A. The temperature employed via annular heater 360 is dependent upon the rare earth dopant concentrations desired in the glass layer to be deposited since the vapor pressure developed at rare earth chloride boat 32 is dependent on the applied heater temperature. Delivery system 20 is coaxially inserted into and arranged in relation to hollow tube 5, for example, through a rotatable, gas-impermeable seal, such that hollow tube 5 can be rotated at a desired rpm about its axis during the process of depositing a glass layer on tube surface 5A. The rate of rotation employed in conjunction with the methods disclosed herein are in the range of about 40 rpm to about 60 rpm, or generally around 50 rpm. Rotation can be effected by employing a lathe or the like as is well known in the art. In the high speed production of preforms taught in patent 4,909,816, and its companion patent 4,217,027, the lath rpm is around 100 rpm. Downstream, as the vapors exit delivery system 20, they encounter reaction zone 5A established by elevated temperatures effected by ribbon gas burner 340 which may be moved transversely and reciprocally along the length of tube 5, as indicated by arrow d, exclusive, of course, of the region of tube 5 housing delivery system 20. Thus, once the gaseous species are mixed together in a reaction zone at 5B of hollow tube 5, a chemical reaction occurs as the reactant vapors pass through the hot zone 342 established by traversing burner 340. Rare earth oxide particles, e.g., particles of Nd-cyclopentadienide, are among the products which become mixed along with other base glass particulate oxides in the soot layer deposited on the walls of hollow refractory tube 5.

Ribbon burner 340, which is axially transportable in upstream and downstream directions along the transverse directions, d, generally comprises a quartz or metal tube having a slit. $H_2$ is injected therein and ignited to provide a flame which heats hollow tube 5 to be heated to the desired temperatures needed to effect soot formation and deposition on surface 5A. When in operation, a soot layer is generally deposited in an area a few inches downstream from the reaction zone SB, as is known in the art. To deposit a layer of soot along the extent of tube 5, ribbon burner 340 is transported down the length of tube 5 in downstream direction. Layers of soot or amorphous glass on surface 5A, depending on the reaction temperature providing by burner, are created by sequential passes of the burner 340 down the length of tube 5 in the downstream direction.

Contemporaneously, immediately after, or eventually after vapor phase deposition, the quartz tube 5 is collapsed to form the finished optical fiber preform. Collapsing is occasioned by exposure of quartz tube 5 to extremely high temperatures, i.e., temperatures higher than glass depositing and sintering temperatures, as is known in the art. Good results in collapsing are achieved when quartz tube 5 is rotated along its axis in conjunction with ribbon burner 340 traversing the length of tube 5, i.e., in the upstream direction.

The employment of the VPD apparatus for conducting the HVP method includes modification to the generally employed VPD apparatus for the MCVD method, in particular, employment of rare earth boat 32, provision of regulators 202 and 222 to prevent the pre-contamination including the pre-oxidation of vapor laden dopants to be delivered to the reaction zone SB, and the generation of a helium streams through components 110 and 116 as an inert carrier gas for the vapor laden dopants. However, inasmuch as they provide specific advantages in the conduct and results of the HVP method, certain further points should be noted in respect of regulators 202 and 222 and rare earth boat 32.

As all the component laden vapors exit delivery tube 200 and 220 of delivery system 20 into the bore of hollow tube 5, they must past initially penetrate through permeable interface in the form quartz glass frits interfaces 202 and 222. Quartz-glass frits 202 and 220 are permeable causing the rare earth chloride vapor laden carrier gas to be dispersed into fine, relatively homogenous gas streams through the frits 202 and 222. In one mode of practice, gas streams in delivery tubes 200 and 220 initially mix, at the downstream end of delivery tube 220 at chamber 224 after passage of the rare earth gas stream through frit interface 202, with intermediates (homogenizers), such as Al, Ga, In, As and/or Sb halide vapors. Then, after their passage through frit interface 222 into tube 5, they are immediately mixed with the halide vapor of the glass forming constituents, such as the halides of silicon, germanium, boron and/or phosphor. Use of the frits interfaces 202 and 220 provides for soot or monolithic glass depositions having enhanced uniformity of deposited components making of the layer or layers as compared to the conventional MCVD method, particularly with the incorporation of rare earth dopants into the deposited layer.

While the inventors do not wish to be bound to any theory used in explanation of their invention, it is believed that in attaining uniform depositions, frits 202 and 222 function to prevent premature particulate formation, thus allowing homogenous vapor to issue from the internal delivery system prior to exposure to elevated temperatures effected by heat source 340. This promotes the homogeneity of the mixture of vapor with dopant vapor, leading to uniformly doped particles. Further, it is also believed that frits 202 and 222, in combination with the downstream flow of gas, reduces considerably the back flow of oxygen into the area of delivery tube 200 wherein rare earth chloride vapors are being directly produced in the HVP method of this invention. The back flow of oxygen can result in the particle-forming oxidation of the rare earth chloride vapor prematurely. If particles are formed prematurely, as they enter the reaction zone at SB, they will grow by accretion, and will be ultimately deposited downstream, resulting, when the deposited layer becomes sintered, in a portion of the formed glass having characteristics different from surrounding areas, a defect known in the art as a "bubble". The presence of "bubble" significantly reduces the optical efficiency of a drawn optical fiber and, generally, if the bubble is an entrapped air bubble as large as the soot particles, one such bubble can render the resultant glass preform useless for fiber drawing.

The HVP method of this invention provides for higher uniformity in the presentation of glass forming materials with the use of the delivery system 20 comprising this invention, particularly relative to higher and maintained concentrations of incorporated rare earth dopants resulting in higher homogeneity in the resultant glass formed layer or layers within the glass or refractory tube than is possible with the MCVD method. In operation, the HVP method is initiated with the provision of a solid form of a rare earth chloride in vessel or boat 32 in, for example, the VPD apparatus illustrated in FIG. 1. The solid rare earth chloride source 32 is exposed, under essentially oxygen- and moisture-free condition, to a temperature elevated sufficiently high to vaporize at least a portion of the solid rare earth chloride under appropriate vapor pressure forming, in a continuous manner, a rare earth chloride laden vapor. The rare earth chloride laden vapor is carried on a flowing stream of inert gas of helium to reaction zone 5A within the bore of a hollow tube 5, contemporaneously with a vapor of material capable of forming glass when exposed to elevated temperatures. The temperature of reaction zone 5A is then elevated to form from the rare earth chloride laden vapor and the vapor of glass forming material at least one layer of soot on surface 5A of tube 5. Several passes of the 342, preferably in the downstream direction (but not of necessity), produces a soot layer. The soot process as opposed to providing a monolithic glass layer, is accomplished by utilizing a hot zone temperature approximately 200° C. to about 300° C. lower than temperatures employed in the MCVD method. The direction of movement of hot zone 342 to bring about a reaction and layer deposit can be accomplished by either or both upstream and/or downstream directions of movement. In the HVP method, usually deposition is utilized during downstream passes. In the HLP method, next to be discussed, the deposition is usually carried out in upstream passes because the upstream passage provides for a deposited, unsintered soot layer having greater porosity which is useful in the application of the subsequent step of rare earth liquid imbibition of the soot layer. It should be noted that deposition in patent 4,909,816 is carried out in the downstream direction to provide for a two-step operation wherein the soot layer is formed in conjunction and simultaneously with the sintering of the same deposited layer employing comparatively higher deposition temperatures immediately after which the tube is collapsed to quickly form a glass preform. However, in the HVP method for forming preforms for producing active fiber, in general, three steps are applied wherein the first step is deposition of a soot layer, the second step of sintering the soot layer and a third step of collapsing the tube. There may further, preferably, be an intervening step between the first and second steps comprising a moisture and oxygen removing step applied to the soot layer prior to collapsing or, alternatively, liquid solution doping imbibition of the soot layer followed by the moisture and oxygen removing step of the soot layer. A lower temperature is employed during the deposition step to achieve a layer having soot consistency, i.e., more porosity which is avoided in the process of patent 4,909,816 to achieve high volume production of preforms for manufacture of transmission type optical fibers.

In the HVP method, therefore, in a preferred form of practice, first the soot layer is formed on the inside surface 5A of the tube through several passes of hot zone 342 followed, second, by the purging of moisture ($H_2O$) and $O_2$ from the deposited soot layer with a flow through the tube of $SF_5$ or $Cl_2$ (driving of moisture in the form of hydrogen chloride) followed, third, by the step of sintering, at a higher temperature, the dehydrated soot layer.

Lastly, depending on predetermined objectives, such as employing a rare earth solution impregnation or imbibition step in accordance with the HLP method disclosed herein (explained below), followed by a subsequent moisture removing step to remove any remaining moisture from the soot layer followed by a sintering step to transform a soot layer into a monolithic glass layer, glass tube 5 can be immediately collapsed employing a higher collapsing temperature.

Previously, reference was made patent 4,666,247 regarding rare earth chloride boat 32. It should be noted that a further advantage of this invention is the provision of multiple premixing tubes where the inner most tube permits the initial establishment of a rare earth component from its solid state form with an inert carrier gas absent any mixing with an intermediate, such as $AlCl_3$, as is the case of patent 4,666,247, which raise the vapor pressure required to create the rare earth vapor. On the other hand, the embodiment of FIG. 1, the rare earth solid state vaporization process is carried out at a lower vapor pressure in the presence of an inert gas and in the absence of any such intermediate, affecting its vapor pressure, and prior to mixing of the created rare earth vapor with the intermediate in the second tube 220 via interface 202. The lower vapor pressure established at boat 32 is only governed by the inert gas and the temperature of boat 32.

It should also be noted from patent 4,666,247 that the employment of a silica wool to provide an oxygen-free atmosphere relative to chamber 24 is not a preferred approach because the rare earth chloride can readily react with the silica wool forming an oxide throughout the material so that reproducibility of the mixing of the rare earth chloride from on run to the next will not be the same. In the case employing a permeable glass frit, the material is high inert so the, while an oxide may form on the outside surface of the outer most glass frit interface 222, it does not substantially affect its permeability so that multiple runs with the same rare earth chloride boat to produce multiple glass preforms can be accomplished with the same glass frit interfaces.

In summary, a feature of the present invention is the achievement of uniform continuous quantities of higher concentrations of rare earth in a vapor form carried by an inert gas which are achieved without the presence of oxygen and the use of a boat that continually provides over time a surface exposure of the solid form the rare earth to be vaporized that does not change in dimension. Also, with the use of annular heater, surrounding the rare earth boat, a high vapor pressure can be achieved for providing higher concentrations of rare earth in vapor form prior to mixing with an intermediate, such as $AlCl_3$, which is separated from the rare earth generation process prior to intermediate mixing due to flow regulator separation. The presence of such an intermediate during the rare earth generation process in the delivery system will prevent higher level of rare earth concentration in the vapor form. The regulated separation is accomplished by employing a first, inert, quartz frit interface that has a predetermined porosity. The solid state rare earth source employing an annular heater provides for a high vapor pressure at the rare earth boat resulting in a vapor laden with higher concentrations of rare earth. The second, inert, quartz frit interface having a predetermined porosity functions as second flow regulator that permits mixing of the generated, comparatively higher concentrations of rare earth vapor, at least 2% or more, with the intermediate prior to their introduction into the reaction zone with the other glass forming constituents. Also, importantly, the second fit interface prevents oxygen from feedback into the preparation region of the rare earth constituent. It is important to make determinations as the thickness and porosity of the frit interfaces relative to their respective delivery tube diameters, taking into consideration that there is higher pressure developed on the outer tube 220 compared to the inner tube 200. In considering frit porosity, the rare earth laden chloride vapor as well as the aluminum chloride laden vapor should be easily penetrable through the frit interface but not so large as to permit the possibility of backward flow of other oxygen entrained gases into tubes 220 and 200. In fact, we have found that oxides of glass forming materials will form, to some extent, on the outside surface 222A of the outer frit interface 222 and not allow oxygen to penetrate through this frit interface. The frit interfaces 202 and 222 perform three functions. First, they function as flow regulators in the forward, downstream direction of regulated amounts of rare earth and intermediate vapors. Second, they function as backflow inhibitor. Third, they function as an attracter for oxides forming on the frit interface outer surface rather than permitting oxygen to pass in a backflow through the frit interface and contaminate the rare earth gases prior to their introducing into the interior of tube 5 for general mixing and reacting with the glass forming constituents just upstream of the heated reaction zone.

Optical fiber preforms made by the HVP method alone have been measured as having, quite desirably, rare earth chloride concentrations as high as 4 wt %. See e.g., Examples 1, 1A to 1C, 1D, and 1F, and Examples 3, 3A, 3B to 3C, and 3D, infra. As evident from a comparison of Example 1 and Example 3, no appreciable difference in the accomplishment of such high concentrations results from depositing the glass layer immediately as consolidated glass under extremely high reaction temperatures such as exemplified in the MCVD method disclosed in U.S. Pat. No. 4,909,816, or as opposed to the stepwise deposition and sintering of particulate soot layers as exemplified in U.S. Pat. No. 4,217,027.

While the HVP method alone is capable of attaining rare earth dopant concentrations sufficient for most fiber laser applications, still higher concentrations can be attained if used in conjunction with the aforementioned HLP method.

According to the HLP method, the predefined concentration and structural distribution of rare earth containing dopant material suited to effect the desired optical properties are built up aecretively by sequential introductions of said dopant material using both the techniques of soot deposition and solution doping. By such carefully measured, accretive introductions, an optical fiber preform having desirably uniform concentrations of rare earth containing dopant material in excess of that possible by either process alone can be obtained.

The process of soot deposition is generally accomplished by first introducing a vapor of glass forming precursor material into the bore of a hollow tube 5, then oxidizing said precursor material at a temperature and for a duration sufficient to effect the deposition onto the surface of said bore of at least one porous or particulate layer of soot. The vapor is formulated to include a first amount of a rare earth dopant material. In accord with the present invention, the dopant material includes a source for rare earth ions, i.e., ions of elements of the lanthanide series of elements (atomic numbers 57–71).

It should be appreciated as important to the accomplishment of the present invention that in the deposition of the layers to be further submitted to solution doping, the temperature should be high enough for the well known vapor phase oxidation reaction to occur but not high enough to sinter the deposited silica. The final result should be a porous or particulate layer with a density of about 0.5 g/cc. At higher temperatures, the oxidized particles will sinter almost immediately upon deposition, and consequently, form a glass layer, which by its monolithic quality, will be incapable of being impregnated with subsequent treatments of liquid doping solutions. At the conclusion of soot deposition, unaided visual observation should reveal an opaque, powdery frosting coating the bore of the tube, which microscopically should reveal layers of porous or particulate soot having generally uniform distribution of crevices, voids, fissures, and/or capillaries.

Into the interstitial spaces of the soot-deposited layers are introduced a dopant solution, which is submitted to conditions appropriate to effect imbibition of the solution into at least one porous or particulate layer of soot. In accord with the present invention, the dopant solution includes a second amount of dopant material. As with the first amount of dopant material, this second amount also includes a source of rare earth ions. Impregnated in targeted soot layers, the rare earth component becomes available for further incorporation into the resultant optical fiber preform, and hence, available for increasing additively the final rare earth content of the preform. The first and second dopant incorporations may also include, in addition, refractive index modulating or modifying components in vapor and liquid form, respectively, e.g., halides or oxides of Al, B or P.

In a preferred mode of practice, the soot is soaked in the desired solution for a relatively long period of time (for example, several hours at room temperature). The impregnation procedure can be accelerated by application of a vacuum and/or heat. In particular, a container holding the soot-coated tube is pumped to low pressure (or vacuum, or heated, or vacuumed and heated) then, the solution with dopants is introduced into the container in a volume sufficient to completely soak the soot-coated tube. After the interstices of the targeted soot layer are fully impregnated, the residue solution is poured away. The dopant-impregnated soot is then dried at approximately 150° C. to 250° C. in ambient air or in an inert atmosphere or under vacuum. Afterwards, the temperature is increased to within the range of approximately 750° C. to 850° C. under oxygen or an oxygen-rich atmosphere to oxidize the rare earth dopant precursor (e.g., rare earth chloride). The solution impregnation operation can be repeated several times to increase the dopant concentration. Chlorine, $SOCl_2$, $CCl_4$, or $SF_6$ gas can be introduced into the atmosphere to promote the dehydration or hydration partition process.

After solution doping, the hollow tube is heated at a temperature and for a duration sufficient to sinter the soot deposited therein and to collapse the tube, said sintering and said collapsing occurring either contemporaneously or sequentially. In the preferred mode of practice, the doped soot containing tube is collapsed into a consolidated rod-like preform at temperatures in excess of 2,000° C.

The resulting optical fiber preform 10 will have incorporated therein an amount of rare 15 earth dopant material that includes substantially both said first and second amounts of rare earth dopant material. Since additional opportunities for introducing dopant material may be employed, as well as the possibility of loss of some incorporated material, the final concentrations of material, while evincing the incorporants of both steps, will not necessarily be the exact sum product of both, and could be either more or less.

While several ways of practicing the HVP and HLP methods can be developed and practiced by those skilled in the art in light of the teachings contained herein, one may use the VPD apparatus schematically illustrated in FIG. 1 to accomplish the vapor phase deposition steps of either or combinations of both methods. The practice of this invention contemplates the following approaches. In the first approach, the HVP method comprises utilizing a solid state form of a rare earth dopant that has exposed dimensional uniformity during its vaporization. This is exemplified in FIG. 1 by the employment of the rare earth chloride boat 32. In the second approach, the HVP method comprises utilizing in combination the rare earth chelate vapor source 124 together with the solid state rare earth source 32 to achieve even higher concentrations of the rare earth constituent or combinations of rare earth constituents (note that these two sources may provide different rare earth components such as Er and Yb for codoping) in the glass forming mixture. In the third approach, the HVP method of the first approach is employed in combination with the HLP method to enhance the rare earth dopant concentration in the deposited soot layer. In the fourth approach, the HVP method of the second approach is employed in combination with the HLP method to maximize rare earth dopant concentration in the deposited soot layer which may then be subsequently dehydrated and sintered to form a monolithic glass layer of high rare earth concentration and high optical homogeneity.

Reference is now made to FIG. 7 illustrating a modification to the HVP method comprising this invention. The description of components in the FIG. 1 embodiment having identical numerical identification for the same components in FIG. 7 is equally applicable to the components in FIG. 7. The modification in FIG. 7 relates to the delivery system 20A which comprises a plurality of rare earth boats 32 and 32A positioned in adjacent relationship to one another. Each rare earth boat is prepared according to the method previously described where one boat may be comprised of a halogen of one rare earth and the other may be comprised of a halogen of another rare earth, e.g., $ErCl_3$ and $YbCl_3$, respectively. It is within the scope of this invention that boats 32 and 32A have the same rare halogen or that several such boats can be provided, in which case, each preferably has its own annular heater 360 and 360A with thermal focusing of heat to the region of its respective boat for controlling the vaporization of each respective rare earth source. Thus, depending upon the vapor pressure of the respective rare earth component positioned within tube 200, heaters 360 and 360A may be independently controlled to provide desired ratios of the rare earth vapors from respective boats 32 and 32A to be fed, via interfaces 202 and 222, into the main glass forming gas stream and intermixed therewith in region 5B.

Reference is now made to a further modification of this invention illustrated in FIG. 8. Multi-quartz glass tube delivery system 800 comprises a plurality of delivery tubes 802, 804 and 806 for independently providing a series of gases that are generated and consecutively mixed prior to final mixing with glass forming gases via delivery tube 808, as in the case of the system shown in FIG. 1. Thus, it is within the scope of this invention to generate rare earth vapors and other vapors of metals, for example, such as the case of intermediates (e.g., $AlCl_3$) prior to mixing in mixing region 830 with oxygen and other oxides of glass forming entrained vapors and, thence, flowing downstream for reaction and deposition on the inner surface of tube 5. As in the case of the FIG. 1 embodiment, the inner most tube 802 may be comprised of a boat 818 of a solid form of a halide rare earth, for example a rare earth chloride, with an inert gas, such as helium provide at inlet 803 to tube 802. Heater 822 provides a heated zone 826 to provided for vaporization of the rare earth into a gas entrained form which passes through permeable glass fit interface 812 into tube 806 and heated zone 828 which contains another boat 820 which may be comprised of a second rare earth halogen or an intermediate solid state form that is vaporized at a rate determined by heater 824 and the corresponding temperature of heating zone 828. In order to achieve a higher concentration in the rare earth vapor, the vaporization of the rare earth in region 826 is accomplished by itself prior to mixing with another vaporized component generated in region 828, both component generated in regions 826 and 828 being highly susceptible to contamination by oxygen or possibly other oxides of glass forming materials when undergoing their generation, but protected from them by means of the glass fit interfaces 812, 814 and 816, in particular, interfaces 812 and 814. Other premixing prior to introduction with gas forming, oxygen entrained vapors together with the oxygen-free generated components in tubes 802 and 804 may be accomplished within third tube 806 in its chamber 829 prior to passage through glass frit interface 829 into mixing region 830 with glass forming materials. Examples of such mixing may be an inert gas entrained rare earth vapor, an additional intermediate, or a glass dopant. It should be noted that it is within the scope of this invention that delivery tubes 802 and 804 may be positioned in adjacent relation within the interior or bore of tube 816 so that independent generation of separate rare earth solid state forms via independent provided inert gas sources can be provided to achieved the highest possible concentrations of vapor forms of the respective rare earths prior to their mixing at region 829 in tube 806. In such a case, boats 818 and 820 may contain the same or different solid state forms of rare earths or one such boat may contain some other solid state form of material employed in the glass forming process, such as a glass dopant or an intermediate. The finished optical fiber preform 10 can be used as the starting material from which any of a variety of fiber optic products can be made. However, in view of the high concentration of rare earth dopant enabled by the practice of the methods described herein, the finished optical fiber preform 10 is especially well-suited for the production of double clad fiber lasers. The glass core in a fiber laser, like other fiber optic products, is that portion that conducts the light from one fiber end to the other. It can be either single mode or multimode, but it has to contain the active rare earth ions for laser. To help retain the light being conducted within the core, an outer cladding layer surrounding the inner cladding and core of the optical fiber is desirable. Prior to drawing and cladding a fiber in this manner, however, post-collapse pre-drawing modifications to the optical fiber preform, such as "resleeving", for example, should be considered.

In respect of one such modifications, it is noted that poor optical results are obtained in fibers drawn from a concentric circular preform, whereas good results are obtained using offset core circular or rectangular or polygonal preform shapes. These shapes are however costly to produce and not easily compatible with certain commercially standard fiber. More recently, good optical results have been accomplished in fibers drawn from a preform which was initially manufactured to be substantially round in cross-section, but was subsequently modified by mechanically grinding the preform slightly to introduce a slight deviation in its otherwise substantially uniformly round cross-sectional configuration. The types of slight imperfections that have proven to be very useful in enhancing mode scrambling are simple flat or concave surfaces, which fortunately are also quite easy to grind, requiring only a relatively few passes of a suitably shaped grinding tool. An optical fiber having good absorption efficiency was drawn from a fiber preform having two very small flats ground into the opposite sides of its otherwise round cross-sectional configuration. See, for example, FIG. 2, which illustrated potential sections A—A and B—B that may be removed grinding or other such process forming flats 13 and 15.

The slight imperfection in the modified preform function essentially as a mode scrambler. In this regard, it will be appreciated, in the propagation of light by internal reflection through a substantially round fiber pathway, certain components of that light will internally reflect continuously down the fiber path length, angling off internal path surfaces in consistently repeating geometric patterns, possibly reflecting off all internal surfaces, but failing entirely in its transit to propagate through the fib-er's central regions. In a conventional double clad fiber laser, this central area is occupied by the fiber core containing the active gain species that serves to concentrate input light in to lasing radiation. To the extent that input light fails to propagate into the central region, it is not absorbed, and hence, the intensity of resultant lasing radiation is diminished. The slight imperfection help to prevent this outcome by essentially changing the fiber internal reflectivity, particularly as it relates to an effective reflection angle, in at least one internal surface of what would otherwise be an unchanging internal circular surface, and, thus, disrupting the possibility of continuously repeating geometric internal reflection patterns.

The use of two flats, rather than one, three, or more is believed to be optimal. One flat has the drawback that the resulting fiber is asymmetric and therefore serves as an impediment to easy fusion splicing or connection to other fiber optic assemblies. Three or more flats results in more "corners" than two flats, and thus more internal scattering but, in addition, requires additional work and increases fabrication costs.

In general, it has been found that flats 13 and 15 of a depth of about 5% to 10% of the diameter of the fiber inner cladding 5 are sufficient to give good mode-scrambling, with the range of about 1% to 25% providing less desirable, but nonetheless acceptable results. In this regard, a depth of less than 1% produces no notable advantages, and the labor involved in the grounding a flat into the preform at depth of greater than 25% is far greater than that necessary to accomplish desirable mode scrambling, and the benefit of compatibility with other fiber assemblies and fibers is lost.

Although it is believed that the provision of the slight imperfection in the optical fiber 20 preform is most easily accomplished by means of mechanical grinding, it is envisioned that in alternative modes of practice, changing the angular reflectivity of the fiber in at least one internal surface of an otherwise unchanging internal circular surface can be chemically accomplished. For example, through an ion diffusion process, the fiber surface material is leached in an ion salt bath to alter the otherwise homogenous surface optical properties thereof.

Other alternatives will become apparent to those skilled in the art in view of the disclosure and suggestions made concerning mode scramming enhancement. Additional information is available in the PCT publication WO 97/12429, published on Apr. 3, 1997.

Further, although unique properties are effected by using such postmanufacture mode scrambling enhancement processes on preforms made by the novel processes described herein, its utility can be extended to several other preform manufacturing processes. For example, the mode scrambling enhancement process can be utilized with preforms made by so called modified chemical vapor deposition (MCVD) processes, such as described in U.S. Pat. No. 4,909,816 (MacChesney et al.), or those produced by so called outside vapor phase oxidation (OVPO) process or the outside vapor deposition (OVD) process, such as discussed in U.S. Pat. No. 3,806,570 (Flamenbaum et al.), or those produced by so called vapor axial deposition (VAD) process, such as described in U.S. Pat. No. 4,062,665 (Izawa et al.).

Regardless of whether post-manufacturing processes are employed, after the hollow tube is collapsed to form a solid compacted preform without any internal voids, an optical fiber may be formed in the usual manner by inserting one end of the preform into a furnace, as schematically illustrated in FIG. 3A, to heat the preform. After the preform is heated, a bait rod or other implement can be used to draw the material in one or more steps, into an optical fiber which retains the original cross-sectional configuration of the starting preform.

Subsequently, outer cladding 40 is deposited onto the drawn fiber, a step that can be effected using any of the conventional techniques known to those skilled in the art. However, in a preferred process, the drawn optical fiber is coated with a photopolymerizable composition, such as disclosed in U.S. Pat. No. 5,534,558, issued to R. A. Minns on Jul. 9, 1996, employing an apparatus such as disclosed in FIG. 3B. The apparatus of FIG. 3B comprises an oven 2 containing the glass preform. Beneath oven 16 are disposed two coating cups 4 and 6, each containing the photopolymerizable outer cladding composition. An ultraviolet lamp 8, for example, a Fusion Research electrodeless ultraviolet mercury vapor lamp, is disposed below the coating cup 6, and a capstan 7 is disposed below lamp 8. The apparatus further includes a wind-up roll 9. As optical fiber is drawn from the oven 16 by the capstan 7, typically at a rate of approximately 0.5 in/sec., the drawn fiber 10 passes through coating cups 4 and 6. These cups are provided with downwardly tapering conical bases, with the apex of each cone having a vertical bore through the cup bottom. The diameter of the bore id equal to the desired diameter of the optical fiber coated with the photopolymerizable composition, so that the bore functions to exclude or wipe excess photopolymerizable composition from the fiber. The fiber, with the uncured photopolymerizable composition thereon, is then traversed past UV lamp 8, where the solution is cured to produce an adherent clear cladding on optical fiber 10.

If desired, before coated clad fiber 10 is wound onto roll 9, the clad fiber may be passed through additional coating cups and under an additional ultraviolet lamp to apply a durable outer coating 50 to protect the typically soft outer polymer cladding 40 from damage. After the completion of coating 50, the coated fiber 10 is, then, wound on roll 9.

Finally, in dividing the continuous lengths of drawn fiber for fiber amplifier or fiber laser applications or other fiber gain media applications, it should be kept in mind, for practical reasons, that the length of the glass fiber for such lasers and/or amplifiers should not be excessively long nor too short to handle. In particular, it is desirable to fabricate a laser and/or amplifier having a relatively short fiber and having a sufficiently high concentration of rare earth dopant material so that substantially all the incident pump light focused on an end is absorbed in one or, at most, two passes through the fiber. More specifically, if the apparatus is employed as a laser, substantially all of the incident pump radiation should be absorbed in one or two passes through the fiber, whereas if the apparatus, is employed as an amplifier, substantially all of the incident pump radiation should be absorbed in a single pass through the fiber.

The present invention will now be described in further detail by the following non-examples of several of its embodiments. These examples are provided as an illustration of the HVP and HLP methods of this invention are not intended to be exhaustive or limiting of the scope of applicability of these methods, but are given for the purposes of illustration and the manner of applying the methods to practical use so that resulting preforms may be modified in various forms, as understood by those skilled in this art, as each may be best suited to the conditions for particular preform-drawn active fibers. Unless otherwise indicated, all parts, percents, ratios, and the like are by weight.

EXAMPLES

Example 1

An optical fiber preform was prepared using the base glass deposition components and parameters set forth in the following Table I.

TABLE I

| Cladding Formation (3 Hot Zone Passes @ 1450° C.)* | | Core Formation (4 Hot Zone Passes @ 1450° C.)* | |
|---|---|---|---|
| Component | Rate | Component | Rate |
| $SiCl_4$ | 500 cc/20° C., 1.1/gmin | $SiCl_4$ | 200 cc/22° C., 0.66 g/min |
|  |  | $GeCl_4$ | 25 cc/20° C., 0.03 g/min |
| $POCl_3$ | 678 cc/20° C. 0.16 g/min | $POCl_3$ | 30 cc/min/20° C., 0.007 g/min |
| $SF_6$ | 0.8 cc/min | $SF_6$ | 0.25 cc/min |
| $O_2$ | 1,000 cc/min | $O_2$ | 1,000 cc/min |
| He | 1,000 cc/min | He | 1,000 cc/min |

*Sintered at 1960° C.

More particularly, during deposition, a glass-forming vapor comprising the listed components was directed into the bore of a quartz tube 5 through outer delivery tube 240 of the multi-concentric delivery system 20 illustrated in FIG. 1, and reacted to form layers of soot. As indicated in the table, the layers of soot that will later comprise the inner cladding of the preform are sintered at the conclusion of deposition, i.e., after the third "pass".

During deposition of the core layers, a stream of helium gas (having a flow rate of approximately 300 cc/min) was passed through aluminum chloride material, which was loaded and heated to 120° C.–150° C. in column 122 shown in FIG. 1. The resulting helium stream, laden with $AlCl_3$ vapor, was directed into the bore of the quartz tube 5 through delivery tube 220 of the multi-concentric delivery system 20. At the same time, a stream of helium gas (also having a flow rate of approximately 300 cc/min) was passed through ytterbium chloride material, which was loaded and heated within the range of about 910° C. to 930° C. (depending on desired concentration) in a rare earth chloride boat 32 positioned inside the central delivery tube 200.

The resulting helium stream, laden with rare earth chloride vapor, was further diluted with a stream of helium gas (having a flow rate of approximately 700 cc/min) and directed into the bore of the quartz tube 5. The glass fits 202 and 222 spread the $AlCl_3$ and ytterbium chloride streams into the base vapor stream which, as indicated above, are reacted to form layers of soot. The layers of soot were subsequently desiccated by exposure to a 50 cc/min stream of chlorine gas for about one to two hours, then collapsed.

The core composition of the finished optical fiber preform was determined under standard Electron Probe Microanalysis. The data collected in mol% are as follows: 98.4% $SiO_2$, 0.65% $Al_2O_3$, 0.6% $GeO_2$, and 0.3% $Yb_2O_3$. Further analysis revealed that the optical fiber preform had low water content. Attenuation was determined to be as low as approximately 4 dB/Km at lasing wavelengths longer than 1 μm. The attenuation curve is shown in FIG. 4.

Examples 1A to 1C

Three optical fiber preforms (i.e., examples 1A to 1C) were prepared by the process used 10 in Example 1. However, for example 1A, the ytterbium chloride material was vaporized at 930° C., for example 1B, at 950° C., and for example 1C, at 980° C.°. It was observed that the core compositions of each of examples 1A to 1C remained the same, but that ytterbium oxide concentrations increased from 1A to 1C, i.e., increased with increasing temperatures used for vaporization. The ytterbium oxide concentration in Example 1C was greater than 3 wt %.

Example 1D

An optical fiber preform was prepared by the process used in Example 1. However, for this example, instead of conducting 4 passes to form the core layers of soot, 8 passes were conducted. The resulting optical fiber preform had a core composition similar to the Example 1 preform, but had a larger core diameter, and thus, better suited for drawing multimode optical fibers.

Example 1E

An optical fiber preform was prepared by the process used in Example 1. However, for this example, instead of ytterbium chloride, erbium chloride heated at 910° C. was used to generate the rare earth chloride vapor. The resulting optical fiber preform had an $Er_2O_3$ concentration of approximately 2.5 wt %. No devitrification by cluster formation was observed.

Example 1F

A Yb:Er co-doped optical fiber preform was prepared by the process used in Example 1. However, in addition to ytterbium chloride, erbium chloride was loaded into a second chloride boat, and positioned next to the ytterbium chloride inside central delivery tube 200. Both rare earth chlorides issued vapor at 998° C.°. The resulting optical fiber preform was homogenous and had appreciable concentrations of $Er_2O_3$, and a $Yb_2O_3$ concentration of 4.0 wt %.

Example 2

An optical fiber preform having a rare earth dopant was prepared by a combination of soot deposition and solution doping techniques. Soot deposition was conducted in the manner described in Example 1, but using the base glass deposition components and parameters set forth in the following Table II.

TABLE II

| Cladding Formation (3 Hot Zone Passes @ 1450° C.)* | | Core Formation (2 Hot Zone Passes @ 1450° C.)* | |
|---|---|---|---|
| Component | Rate | Component | Rate |
| $SiCl_4$ | 500 cc/20° C., 1.1/g/min | $SiCl_4$ | 100 cc 0.33 g/min |
| | | $GeCl_4$ | 20 cc, 0.022 g/min |
| $POCl_3$ | 678 cc/20° C. 0.16 g/min | | |
| $SF_6$ | 0.8 cc/min | | |
| $O_2$ | 1,000 cc/min | | |
| He | 1,000 cc/min | | |

*Sintered at 1960° C.

Unlike Example 1, following soot deposition, the core layers of soot were not subsequently sintered, nor was the tube collapsed. Rather, the soot preform was placed in a tubular container, and subsequently evacuated to lower than about 1 to $10^{-1}$ Torr. The solution shown comprising ingredients set forth in the following Table III was introduced into the container under vacuum soaking the soot coated tube.

TABLE III

| Doping Solution | |
|---|---|
| Component | Amount |
| $H_2O$ | 40 cc |
| $Al(NO)_3 \cdot 9H_2O$ | 1.28 g |
| $Yb(NO)_3 \cdot 5H_2O$ | 6.14 g |
| $Er(NO)_3 \cdot 5H_2O$ | 2.66 |

After approximately 2 hours, the doping solution was poured away and the soot coated tube was dried at approximately 150° C. to 250° C. The soaking procedure was repeated.

The soot coated tube was then dehydrated, calcined, and sintered and collapsed, yielding a finished co-doped optical fiber preform. Dehydration, using a stream of gas containing $Cl_2$ (delivered at 50 cc/min to 80 cc/min) and $O_2$ (delivered at 1,000 cc/min), was conducted at 150° C. for approximately 30 minutes, then at about 750° C. to 800° C. for about 2 hours. Sintering and collapsing was conducted in a single pass at a temperature in the range of about 1,960° C. to 1,980° C. with a gas stream comprising $O_2$ and He (both delivered at 1,000 cc/min) passed through the bore of the tube.

The core composition of the finished co-doped optical fiber preform comprised, as determined under standard Electron Probe Microanalysis, 2.5 wt % $Yb_2O_3$, 0.3 wt % $Er_2O_3$, and a silica content greater than 97 mol %.

Example 3

An optical fiber preform was prepared, using the base glass deposition components and deposition parameters set forth in the following Table IV.

TABLE IV

| Cladding Formation (4 Hot Zone Passes @ 1830° C.) | | Core Formation (4 Hot Zone Passes @ 1800° C.–1850° C.) | |
|---|---|---|---|
| Component | Rate | Component | Rate |
| $SiCl_4$ | 500 cc/22° C., 1.1 g/min | $SiCl_4$ | 200 cc/22° C., 0.66 g/min |
| | | $GeCl_4$ | 25 cc/22° C., 0.03 g/min |
| $POCl_3$ | 678 cc/22° C., 0.16 g/min | $POCl_3$ | 30 cc/min/20° C., 0.007 g/min |
| $SF_6$ | 0.8 cc/min | $SF_6$ | 0.25 cc/min |
| $O_2$ | 1,000 cc/min | $O_2$ | 1,000 cc/min |
| He | 1,000 cc/min | He | 1,000 cc/min |

More particularly, during deposition, a glass forming vapor comprising the listed components was directed into the bore of a quartz tube 5 through outer delivery tube 240 of the multi-concentric delivery system 20 illustrated in FIG. 1. Unlike Examples 1 and 2, above, the high temperatures used in each pass resulted in the immediate deposition of a monolithic glass layer on the internal surfaces of the quartz tube 5.

During deposition of the core layers, a stream of helium gas (having a flow rate of approximately 300 cc/min) was passed though aluminum chloride material, which was loaded and heated to about 120° C. to 150° C. in column 122 shown in FIG. 1. The resulting helium stream, laden with $AlCl_3$ vapor, was directed into the bore of the quartz tube 5 through delivery tube 220 of the multi-concentric delivery system 20. At the same time, a stream of helium gas (also having a flow rate of approximately 300 cc/min) was passed through ytterbium chloride material, which was loaded and heated within the temperature range of about 910° C. to 930° C. (depending on desired concentration) in a rare earth chloride boat 32 positioned inside the central delivery tube 200.

The resulting helium stream, laden with rare earth chloride vapor, was further diluted with a stream of helium gas (having a flow rate of approximately 700 cc/min) and directed into the bore of the quartz tube 5. Glass frits 202 and 222 were used to spread the $AlCl_3$ and ytterbium chloride streams into the base vapor stream which are then reacted under extremely high temperatures, i.e., in the range of about 1,800° C. to 1,850° C., to form one or more layers of amorphous glass on the surface of the bore. Collapsing the tube resulted in the finished optical fiber preform.

The core composition of the finished optical fiber preform was determined under standard Electron Probe Microanalysis. The data collected in mol % was identical to that retrieved from Example 1, which again are as follows: 98.4% $SiO_2$, 0.65% $Al_2O_3$, 0.6% $GeO_2$, and 0.3% $Yb_9O_3$.

Example 3A

A preform was prepared by the prepared by the process used in Example 3. However, instead of using extremely high temperature during deposition of the core layers to thereby form immediately amorphous glass, a comparatively lower temperature of about 1,650° C. was used to deposit layers of soot. The layers of soot were then treated with 50 cc/min chlorine for about one to two hours to enhance water removal, then, sintered at approximately 1,980° C. to 2,000° C. to fuse the soot layer into a uniform glass layer. Collapsing the hollow tube resulted in a solid cylindrical optical fiber preform. The finished preform had similar composition as the preform of Example 3. The attenuation was as low as approximately 4 dB/Km at lasing wavelengths longer than 1 μm.

Examples 3B to 3D

Three optical fiber preforms (i.e., examples 3B to 3D, respectively) were prepared by the process used in Example 3. However, for example 3B, the ytterbium chloride material was vaporized at about 930° C., for example 3C, at about 950° C., and for example 3D, at about 980° C.

Upon analysis, it was observed that the core compositions in each of examples 3B to 3D substantially identical, but that ytterbium oxide concentrations increased from 3B to 3D, i.e., the rare earth oxide concentration increased as the temperature used for vaporization increased. The ytterbium oxide concentration in the optical fiber preform of Example 3C was greater than 3 wt %.

Example 4

A preform according to the invention was prepared using Nd-cyclopentadiene as dopant precursor. The base glass deposition components and parameters are set forth in the following Table V.

TABLE V

| Cladding Formation (4 Hot Zone Passes @ 1830° C.) | | Core (4 Hot Zone Passes @ 1790° C.–1820° C.) | |
|---|---|---|---|
| Component | Rate | Component | Rate |
| $SiCl_4$ | 500 cc/22° C., 1.1 g/min | $SiCl_4$ | 200 cc/22° C., 0.66 g/min |
| | | $GeCl_4$ | 25 cc/22° C., 0.03 g/min |
| $POCl_3$ | 678 cc/22° C. 0.16 g/min | $POCl_3$ | 40 cc/min/20° C., |
| $SF_6$ | 0.8 cc/min | | |
| $O_2$ | 1,000 cc/min | $O_2$ | 1,000 cc/min |
| He | 1,000 cc/min | He | 1,000 cc/min |

In particular, a stream of helium gas (having a flow rate of approximately 300 cc/min) was passed through aluminum chloride material, the aluminum chloride material having been loaded and heated to about 120° C. to 150° C. in the column 122 of the VPD apparatus shown in FIG. 1. The resulting stream helium gas, laden with $AlCl_3$ vapor, was directed into the bore of quartz tube 5 through delivery tube 220. At the same time, a stream of helium gas (also having a flow rate of approximately 300 cc/min) was passed through the rare earth compound Nd-cyclopentadienide (ND-$CP_3$), the ND-$CP_3$ material having been loaded and heated to approximately 230° C. in column 124. The resulting stream of helium gas, laden with ND-$CP_3$ vapor, was directed into the bore of quartz tube 5 through central delivery tube 200. (A chloride boat 32 was not used in central delivery tube 200.) Glass frits 202 and 222 dispersed the $AlCl_3$ and ND-$CP_3$ streams into a base glass vapor stream, the base glass vapor stream have been formulated as indicated in the table above and delivered into quartz tube 5 through outer delivery tube 240. The vapor laden helium streams arriving and merging in quartz tube 5 were reacted under extremely high temperatures (i.e., about 1,800° C. to about 1,850° C.') to form one or more layers of rare earth doped amorphous glass on the surface of tube 5. The tube was collapsed to provide a finished optical fiber preform.

The core composition of the finished optical fiber preform was determined under standard Electron Probe Microanalysis. The neodymium oxide concentration of the preform was 1 wt %, the silica content of the preform was greater than 97 mol %. The core attenuation of a double clad fiber laser prepared from the preform in accordance with the methods disclosed in U.S. Pat. Nos. 4,815,079 (Snitzer et al.) and 5,534,558 (Minus) was lower than 10 dB/Km at about 1,000 nm to 1,200 nm lasing wavelength. The slope of efficiency of the double clad fiber laser was greater than 50%.

Example 5

An optical fiber preform was prepared in the manner described for Example 2. However, higher temperatures were used to effect the deposition of the cladding layer, thus resulting in the relative immediate deposition of amorphous glass. To accommodate such higher temperature, slight modification were made to the base glass deposition components and parameters as shown the following Table VI.

TABLE VI

| Cladding Formation (4 Hot Zone Passes @ 1830° C.) | | Core (2 Hot Zone Passes @ 1450° C. | |
|---|---|---|---|
| Component | Rate | Component | Rate |
| $SiCl_4$ | 500 cc/22° C., 1.1 g/min | $SiCl_4$ | 100 cc/22° C., 0.33 g/min |
| | | $GeCl_4$ | 20 cc/22° C., 0.22 g/min |
| $POCl_3$ | 678 cc/22° C. 0.16 g/min | | |
| $SF_6$ | 0.8 cc/min | | |
| $O_2$ | 1,000 cc/min | | |
| He | 1,000 cc/min | | |

All else was similar to Example 2, including the solution doping steps following deposition of core layers of soot. Regardless, the core composition of the finished optical fiber preform, as determined by standard Electron Probe Microanalysis, was similar to that of the preform made in Example 2: i.e., 2.5 wt % $Yb_2O_3$ and 0.4% wt % $Er_2O_3$, and a silica content greater than 97 mol %.

It will be appreciated from the above that as a result of the present invention, a highly effective method for forming an optical fiber preform and apparatus therefor is provided by which the principal objects, among others, is fulfilled. It will be equally apparent and is contemplated that modification and/or changes may be made in the illustrated embodiment without departure from the invention. While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above described exemplary embodiments, but should be defined only in accordance with the following claims and their equivalents.

What is claimed is:

1. Apparatus for the delivery of constituents in the manufacture of a glass fiber preform comprising:
    a main glass tube;
    a plurality, of smaller tubes comprising at least two tubes for insertion into one end of said main glass tube, each of said tubes having an input end and an output end, the output ends being the most interior end within the main glass tube;
    the inner most of said tubes having a first tube interface at its output that permits forward regulated flow into a second of said tubes but prevents backward flow through the first tube interface;

said inner most tube having a first chamber containing a solid state form of a first glass constituent;

the second of said tubes having a second chamber for mixing a second glass constituent with a vapor form of said first glass constituent after passage of the latter through said first tube interface to form a mixture of constituents, the second tube having a second tube interface at its output that permits forward regulated flow into a further tube of said plurality of smaller tubes or into said main glass tube but prevents backward flow through the second tube interface;

the mixture of said constituents mixing with other glass forming constituents within said main glass tube after passage through said tubes interfaces so that said other glass forming constituents are impeded from entering said first and second chambers via said first and second tube interfaces.

2. The apparatus of claim 1 wherein a boat is positioned in at least one of said chambers of either said inner most or second tube, said boat containing a solid state form of its glass constituent.

3. The apparatus of claim 2 wherein an inert gas is provided at the input end of said boat containing tube.

4. The apparatus of claim 3 wherein a vapor form of the glass constituent is also provided at the input of said boat containing tube.

5. The apparatus of claim 4 wherein the glass constituent in solid state form and vapor form comprise a rare earth halogen.

6. The method of claim 5 wherein the rare earth halogen is a chloride of Nd, Yb, Er, Tm, Ho or Sm.

7. The apparatus of claim 2 wherein a heater is provided to surround said boat containing tube at the position of the boat.

8. The apparatus of claim 2 wherein said boat has an exposed two dimensional surface of said glass constituent solid state form.

9. The apparatus of claim 1 wherein said first glass constituent is a rare earth halogen.

10. The apparatus of claim 9 wherein said rare earth halogen is vaporized and transported via an inert gas provided at the input of its tube.

11. The apparatus of claim 10 wherein said inert gas is helium.

12. The apparatus of claim 9 wherein said rare earth halogen is a chloride of Nd, Yb, Er, Tm, Ho or Sm.

13. The apparatus of claim 1 wherein at least one of said first or second tube chambers is surrounded by a heater for providing a high temperature in said chamber.

14. The apparatus of claim 13 wherein said heater comprises an annular shaped resistance heater or a rf heater.

15. The apparatus of claim 13 wherein a boat is positioned in said one chamber containing said solid state constituent.

16. The apparatus of claim 15 wherein said boat has an exposed two dimensional surface of said solid state glass constituent, said heater providing a temperature within said one chamber to vaporize said solid state glass constituent.

17. The apparatus of claim 16 wherein said glass constituent is a rare earth halogen.

18. The apparatus of claim 17 wherein said rare earth halogen is vaporized and transported via an inert gas provided at the input of its tube.

19. The apparatus of claim 18 wherein said inert gas is helium.

20. The apparatus of claim 17 wherein said rare earth halogen is a chloride of Nd, Yb, Er, Tm, Ho or Sm.

21. The apparatus of claim 1 wherein said first and second chambers contain at least one boat positioned in its chamber, said boat containing a solid state form of a glass constituent.

22. The apparatus of claim 22 wherein at least one of said solid state constituents is a rare earth halogen.

23. The apparatus of claim 22 wherein said rare earth halogen is vaporized and transported via an inert gas provided at the input of its tube.

24. The apparatus of claim 23 wherein said inert gas is helium.

25. The apparatus of claim 24 wherein said rare earth halogen is a chloride of Nd, Yb, Er, Tm, Ho or Sm.

26. The apparatus of claim 21 wherein said first and second chambers are surrounded by a heater for providing a high temperature in said first ad second chambers.

27. The apparatus of claim 21 wherein at least one of said solid state constituents is a glass intermediate.

28. The apparatus of claim 27 wherein said intermediate is a halide vapor of one or more of Al, Ga, In, As and/or Sb.

29. The apparatus of claim 1 wherein at least some of said plurality of smaller tubes are positioned in said main glass tube in concentric relationship.

30. The apparatus of claim 1 wherein at least some of said plurality of smaller tubes are positioned in said main glass tube in juxtaposed relationship.

31. The apparatus of claim 1 comprising a third of said plurality of smaller tubes for insertion into said one end of said main glass tube to provide for the introduction into said main glass tube of glass forming constituents.

32. The apparatus of claim 1 wherein at least one of said plurality of smaller tubes contains at least two boats positioned in its chamber, each of said boats containing a solid state form of a glass constituent.

33. The apparatus of claim 32 wherein at least one of said boats contain a solid state constituent comprising a rare earth halogen.

34. The apparatus of claim 33 wherein said rare earth halogen is vaporized and transported via an inert gas provided at the input of its tube.

35. The apparatus of claim 34 wherein said inert gas is helium.

36. The apparatus of claim 35 wherein said rare earth halogen is a chloride of Nd, Yb, Er, Tm, Ho or Sm.

37. The apparatus of claim 32 wherein the chamber holding said boats is surrounded by at least one heater for providing a high temperature in said chamber.

* * * * *